US008498528B2

(12) United States Patent
Suzuka

(10) Patent No.: US 8,498,528 B2
(45) Date of Patent: Jul. 30, 2013

(54) POSITION CONTROLLER FOR IMAGE-STABILIZING INSERTABLE/REMOVABLE OPTICAL ELEMENT

(75) Inventor: Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/402,072

(22) Filed: Feb. 22, 2012

(65) Prior Publication Data

US 2012/0219276 A1   Aug. 30, 2012

(30) Foreign Application Priority Data

Feb. 28, 2011  (JP) .................................. 2011-042027
Mar. 24, 2011  (JP) .................................. 2011-066485

(51) Int. Cl.
*G03B 17/00* (2006.01)
*G03B 5/06* (2006.01)

(52) U.S. Cl.
USPC ............. 396/55; 396/350; 359/557; 359/813; 348/208.11

(58) Field of Classification Search
USPC .................. 396/55, 350, 52–54, 73; 359/557, 359/554, 813; 348/208.11
See application file for complete search history.

(56) References Cited

U.S. PATENT DOCUMENTS 7,630,618 B2 * 12/2009 Nomura ........................... 396/55
8,090,249 B2   1/2012 Suzuka
8,121,467 B2   2/2012 Suzuka
8,275,249 B2 * 9/2012 Imura et al. ..................... 396/55
2011/0181740 A1   7/2011 Watanabe et al.

FOREIGN PATENT DOCUMENTS

| JP | 2003195383 A | * | 7/2003 |
|---|---|---|---|
| JP | 2006080969 A | * | 3/2006 |
| JP | 2007-206210 | | 8/2007 |
| JP | 2010-128389 | | 6/2010 |
| JP | 2010-271607 | | 12/2010 |

OTHER PUBLICATIONS

U.S. Appl. No. 13/352,564 to Shinya Suzuka, filed Jan. 18, 2012.
U.S. Appl. No. 13/372,938 to Shinya Suzuka, filed Feb. 14, 2012.
U.S. Appl. No. 13/372,955 to Shinya Suzuka, filed Feb. 14, 2012.
U.S. Appl. No. 13/372,969 to Shinya Suzuka, filed Feb. 14, 2012.
U.S. Appl. No. 13/372,987 to Shinya Suzuka, filed Feb. 14, 2012.
U.S. Appl. No. 13/402,065 to Shinya Suzuka, filed Feb. 22, 2012.

* cited by examiner

*Primary Examiner* — Christopher Mahoney
(74) *Attorney, Agent, or Firm* — Greenblum & Bernstein P.L.C.

(57) ABSTRACT

A position controller for an image stabilizing optical element in an optical system includes an advancing/retracting frame which holds part of the optical system, a main actuator, an anti shake movable frame supported by the advancing/retracting frame, an anti shake drive actuator, an insertable/removable frame which holds the image stabilizing optical element and is supported by the anti shake movable frame, a removal drive mechanism which engages with the insertable/removable frame and moves the insertable/removable frame from an insertion position to a removed position, and a controller. Upon an inputter inputting a lens accommodating drive signal to the controller, the controller switches the anti shake drive actuator to a non driving state before moving the insertable/removable frame to the removed position by moving the advancing/retracting frame toward the accommodated position.

8 Claims, 18 Drawing Sheets

POSITION CONTROLLER FOR IMAGE-STABILIZING INSERTABLE/REMOVABLE OPTICAL ELEMENT

BACKGROUND OF THE INVENTION

1. Field of the Invention

The present invention relates to a position controller for an optical element which can be moved to correct image shake and removed to a position outside an anti-shake driving range of the optical element.

2. Description of the Related Art

Conventional anti-shake drive mechanisms using a voice coil motor (VCM) are provided with a constrained frame, the position of which in directions orthogonal to an optical axis is constrained, an anti-shake movable frame (image-stabilizing lens) which is supported by the constrained frame to be movable in direction orthogonal to the optical axis, and an anti-shake drive actuator (anti-shake coils); and the anti-shake movable frame is driven and controlled in a plane orthogonal to the optical axis relative to the constrained frame by controlling the passage of electric current through the anti-shake drive actuator (anti-shake coils). In such anti-shake drive mechanisms, no operation for holding the anti-shake movable frame at a specific position when no current is passed through the anti-shake drive actuator (anti-shake coils) is performed, and accordingly, to prevent the anti-shake movable frame from rattling, it is required to lock the anti-shake movable frame with respect to the constrained frame using a separate member from the anti-shake movable frame.

For instance, in Japanese Unexamined Patent Publication No. 2010-271607, the anti-shake drive mechanism is provided with a movement limit member (lock shaft) which is movable by rotating in a plane orthogonal to an optical axis between a movement limit position, in which an anti-shake movable frame (image-stabilizing lens) is prevented from moving, and a movement limit release position, in which the anti-shake movable frame (image-stabilizing lens) is allowed to move, and the anti-shake movable frame (image-stabilizing lens) is locked by positioning the movement limit member in the movement limit position when no current is passed through an anti-shake drive actuator (anti-shake coils). In addition, in Japanese Unexamined Patent Publication No. 2010-128389, the anti-shake drive mechanism is provided with a return magnet which is a separate member from the anti-shake magnets of the anti-shake drive actuator, and this return magnet is used to center an anti-shake movable frame (image-stabilizing lens) when no current is passed through an anti-shake drive actuator (anti-shake coils).

On the other hand, a technique for removing (radially retracting) an image-stabilizing lens to a position off an optical axis of a lens barrel when an optical device that incorporates the anti-shake drive mechanism moves from an operating state (ready-to-photograph state) to a lens barrel accommodated state (fully retracted state/non-operating state) in which no pictures are taken, has been proposed for the purpose of making the lens barrel compact in size (slimming the lens barrel) with respect to the optical axis direction. For instance, in Japanese Unexamined Patent Publication No. 2007-206210, an image-stabilizing lens is pivotally supported by an anti-shake movable frame which moves in a plane orthogonal to an optical axis by an anti-shake drive actuator (anti-shake coils), and after the commencement of the movement of the anti-shake movable frame from a ready-to-photograph position to the lens barrel accommodated position that is caused by a main actuator (zoom motor), firstly the anti-shake movable frame is centered by the anti-shake drive actuator and fixed by a stopper member, subsequently the passage of current through the anti-shake drive actuator is shut off, and lastly the image-stabilizing lens is removed to a position off the optical axis by a removal drive member (cam bar).

However, in the structure disclosed in the aforementioned Japanese Unexamined Patent Publication No. 2007-206210, since the retractive movement of the anti-shake movable frame that is caused by the main actuator commences with electric current remaining passed through the anti-shake drive actuator, excessive current is passed through the anti-shake coils as a result of the anti-shake drive actuator continuing to drive the anti-shake movable frame to move the anti-shake movable frame to the initial position thereof during the retractive movement of the anti-shake movable frame, which may cause damage to the anti-shake drive actuator and waste electrical power.

SUMMARY OF THE INVENTION

The present invention has been devised in view of the above-mentioned drawbacks and provides a position controller for an insertable/removable image-stabilizing optical element that can be moved to correct image shake and removed to a position outside an anti-shake driving range of the optical element, wherein the position controller is configured so as to be prevented from being damaged due to an excessive amount of current being passed through the anti-shake coils and prevented from wasting electric power during the retractive movement of the anti-shake movable frame that includes the movement of the image-stabilizing lens to the removed position.

According to an aspect of the present invention, a position controller for an image-stabilizing optical element is provided in a photographing optical system, the position controller including an advancing/retracting frame which moves in an optical axis direction of the photographing optical system between a ready-to-photograph position and an accommodated position; a main actuator which drives the advancing/retracting frame between the ready-to-photograph position and the accommodated position; an anti-shake movable frame supported by the advancing/retracting frame to be movable in directions orthogonal to the optical axis; an anti-shake drive actuator which includes at least one coil and at least one magnet installed to one and the other of the advancing/retracting frame and the anti-shake movable frame and drives and controls the anti-shake movable frame with respect to the advancing/retracting frame in a plane orthogonal to the optical axis by controlling passage of current through the coil; an insertable/removable frame which holds the image-stabilizing optical element and is supported by the anti-shake movable frame to be movable between an insertion position in which the image-stabilizing optical element is positioned on the optical axis when the advancing/retracting frame is in the ready-to-photograph position and a removed position in which an optical axis of the image-stabilizing optical element is removed from the optical axis of the photographing optical system when the advancing/retracting frame is in the accommodated position; a removal drive mechanism which engages with the insertable/removable frame and moves the insertable/removable frame from the insertion position to the removed position when the advancing/retracting frame is moved from the ready-to-photograph position to the accommodated position by the main actuator; a controller which controls operations of the main actuator and the anti-shake drive actuator; and an inputter which inputs an accommodating command signal for moving the advancing/retracting frame from the ready-to-photograph position to the accommodated position by the main actuator to the controller. Upon the inputter inputting the lens-accommodating drive signal to the controller, the controller shuts off the passage of current through the coil to switch the anti-shake drive actuator from a driving state thereof to a non-driving state thereof before moving the insertable/removable frame from the insertion position to the removed position via the removal drive mechanism by moving the advancing/retracting frame toward the accommodated position from the ready-to-photograph position using the main actuator.

Upon the inputter inputting the accommodating command signal to the controller, it is desirable for the controller to shut off the passage of current through the coil to switch the anti-shake drive actuator from a driving state to a non-driving state and thereafter move the advancing/retracting frame toward the accommodated position from the ready-to-photograph position using the main actuator.

Furthermore, upon the inputter inputting the accommodating command signal to the controller, it is desirable for the controller to send an excitation cancel command signal for shutting off the passage of current through the coil to the anti-shake drive actuator and to thereafter send an accommodating drive command signal for accommodating the advancing/retracting frame to the main actuator.

It is desirable for the removal drive mechanism to make the anti-shake movable frame follow movement of the insertable/removable frame in a direction toward the removed position of the insertable/removable frame when moving the insertable/removable frame from the insertion position to the removed position via the removal drive mechanism, and for the removal drive mechanism to hold the anti-shake movable frame at a specific position in a plane orthogonal to the optical axis when the insertable/removable frame is held at the removed position by the removal drive mechanism.

It is desirable for the position controller to include at least one guide member installed between the advancing/retracting frame and the anti-shake movable frame to allow the anti-shake movable frame to move in a plane orthogonal to the optical axis with the guide member held between the advancing/retracting frame and the anti-shake movable frame; a first biaser which biases the advancing/retracting frame and the anti-shake movable frame in directions toward each other in the optical axis direction to keep the guide member held between the advancing/retracting frame and the anti-shake movable frame; a second biaser which biases the insertable/removable frame to move toward the insertion position; and a movement limiter which limits a moving range of the anti-shake movable frame at least toward the removed position of the insertable/removable frame. A resistance to movement of the insertable/removable frame toward the removed position that is caused by the second biaser is greater than a resistance to movement of the anti-shake movable frame that is caused by the first spring. The removal drive mechanism moves the anti-shake movable frame together with the insertable/removable frame toward the removed position thereof until movement of the anti-shake movable frame is limited by the movement limiter, and thereafter moves the insertable/removable frame solely to the removed position with the anti-shake movable frame held by the movement limiter at a specific position in a plane orthogonal to the optical axis.

It is desirable for the main actuator to be a motor.

It is desirable for the removal drive mechanism to include a lever pivoted about a shaft parallel to the optical axis and a control projection which is fixed to the position controller as a stationary member, wherein the control projection comes in contact with and presses the lever so that the lever engages with the insertable/removable frame and moves the insertable/removable frame from the insertion position to the removed position when the advancing/retracting frame is moved from the ready-to-photograph position to the accommodated position.

It is desirable for the at least one guide member to include at least three balls.

According to the position controller for an image-stabilizing insertable/removable optical element according to the present invention, in a driving state of the anti-shake drive actuator (in which the coils are excited), upon the inputter inputting the accommodating command signal to the controller, the controller shuts off the passage of current through the coil to switch the anti-shake drive actuator from a driving state to a non-driving state before moving the insertable/removable frame (which holds the insertable/removable image-stabilizing optical element) from the insertion position to the removed position via the removal drive mechanism by moving the advancing/retracting frame toward the accommodated position from a ready-to-photograph position using the main actuator, which makes it possible to prevent the anti-shake drive actuator from being damaged due to an excessive amount current being passed through the coils and wasting electric power during the retractive movement of the anti-shake movable frame that includes the movement of the insertable/removable image-stabilizing optical element to the removed position.

The present disclosure relates to subject matter contained in Japanese Patent Application No. 2011-42027 (filed on Feb. 28, 2011) and No. 2011-66485 (filed on Mar. 24, 2011) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
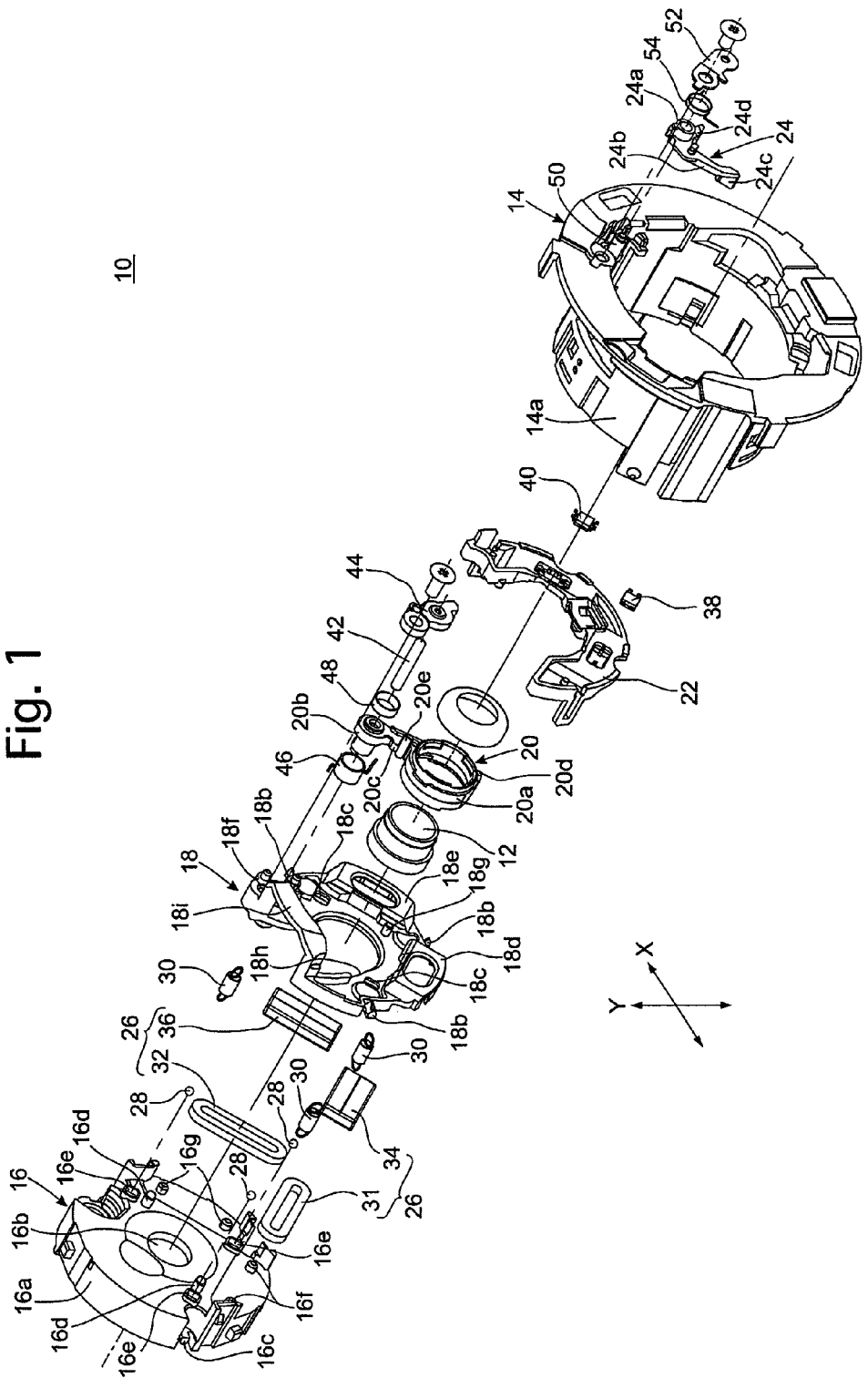
FIG. 1 is a rear exploded perspective view of an embodiment of an anti-shake lens unit according to the present invention that is designed for a lens shutter camera having a retractable photographic lens.
Figure 2:
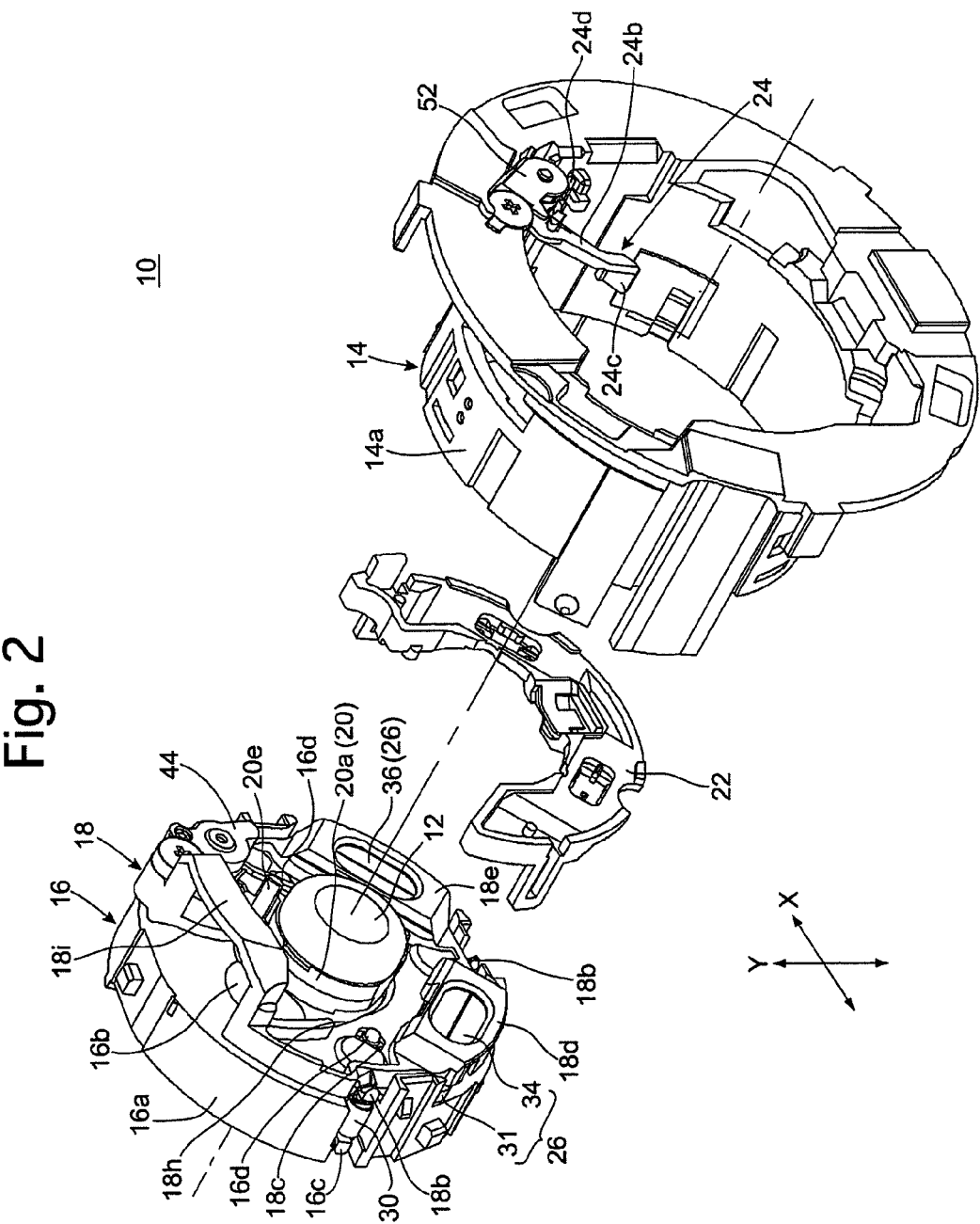
FIG. 2 is an exploded rear perspective view of the anti-shake lens unit with a sensor holder and a linear moving ring dismounted.
Figure 3:
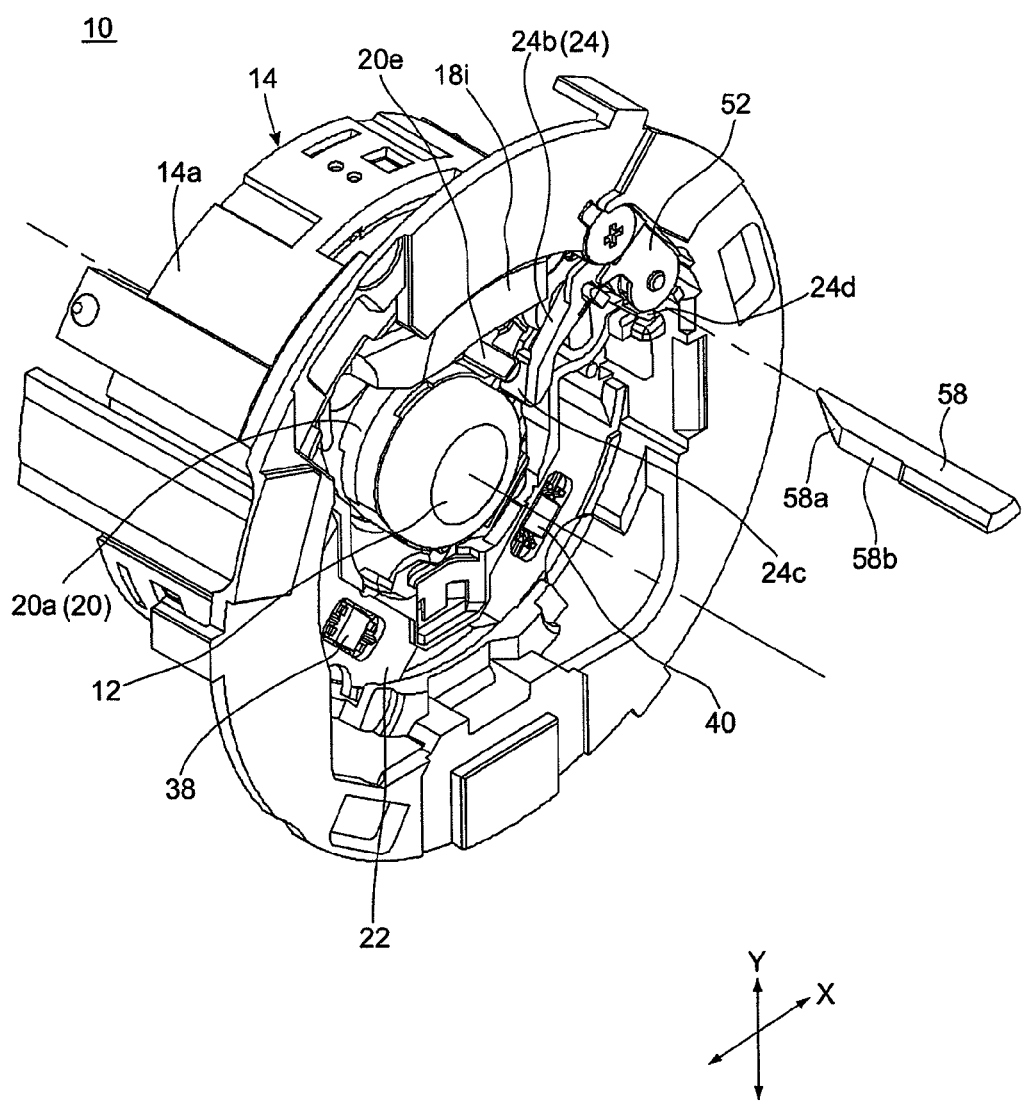
FIG. 3 is a rear perspective view of the anti-shake lens unit and a insertion/removal control-projection in the middle of the lens barrel retracting operation of the lens barrel.
Figure 4:
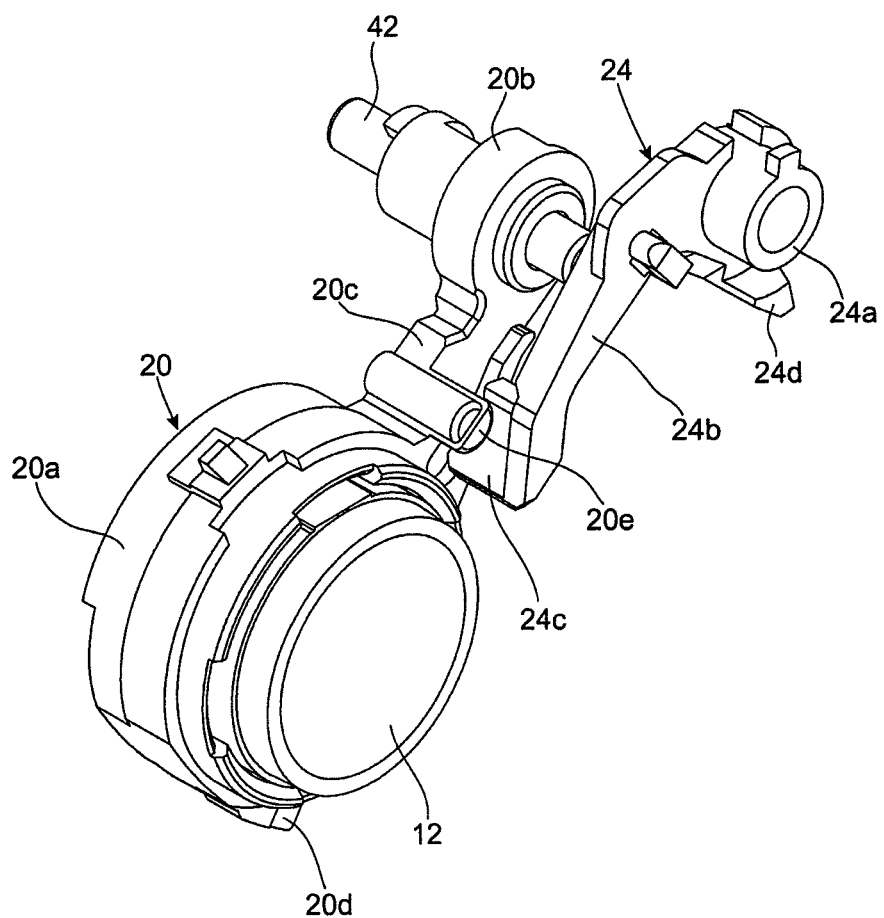
FIG. 4 is a rear perspective view of an insertable/removable frame and a removal drive lever, showing the positional relationship therebetween in a ready-to-photograph state of the lens barrel.
Figure 5:
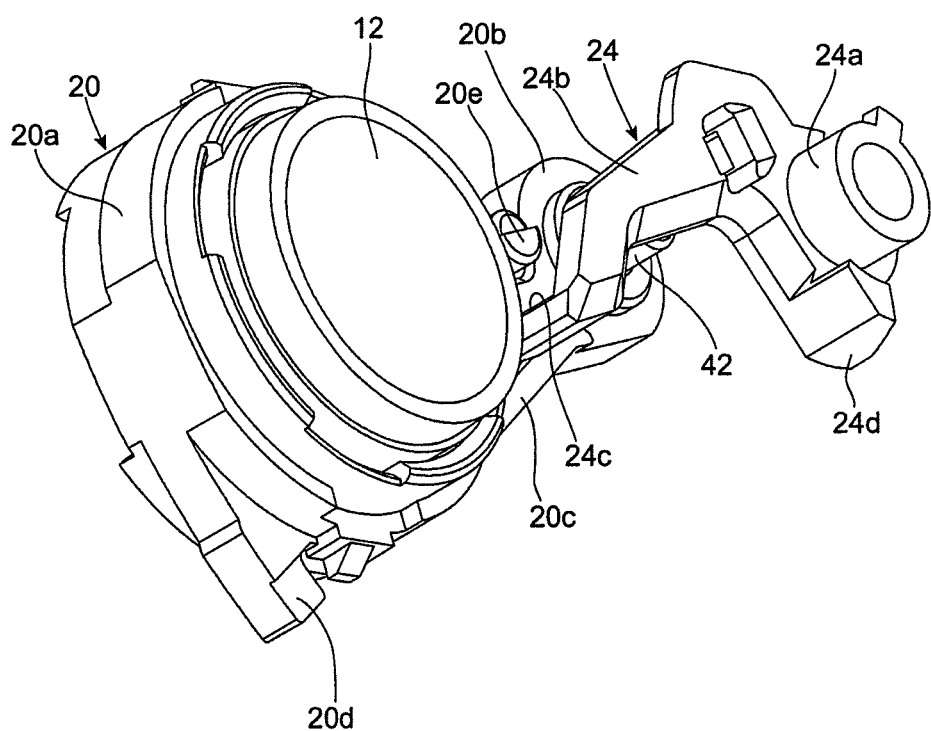
FIG. 5 is a rear perspective view of the insertable/removable frame and the removal drive lever in the ready-to-photograph state of the lens barrel, viewed from a different angle.

An anti-shake lens unit 10 shown in FIGS. 1 through 3 supports an insertable/removable image-stabilizing lens (insertable/removable image-stabilizing optical element) 12 which constitutes a part of a photographing optical system of a lens barrel of a camera. As shown in FIG. 1, the anti-shake lens unit 10 is provided with a linear moving ring (advancing/retracting frame) 14, and is provided in the linear moving ring 14 with a shutter unit (advancing/retracting frame) 16, an anti-shake frame (anti-shake movable frame) 18, an insertable/removable frame 20, a sensor holder 22, a removal drive lever (removal drive mechanism/rotational relay member) and an anti-shake drive actuator (anti-shake drive mechanism) 26.

Figure 15:
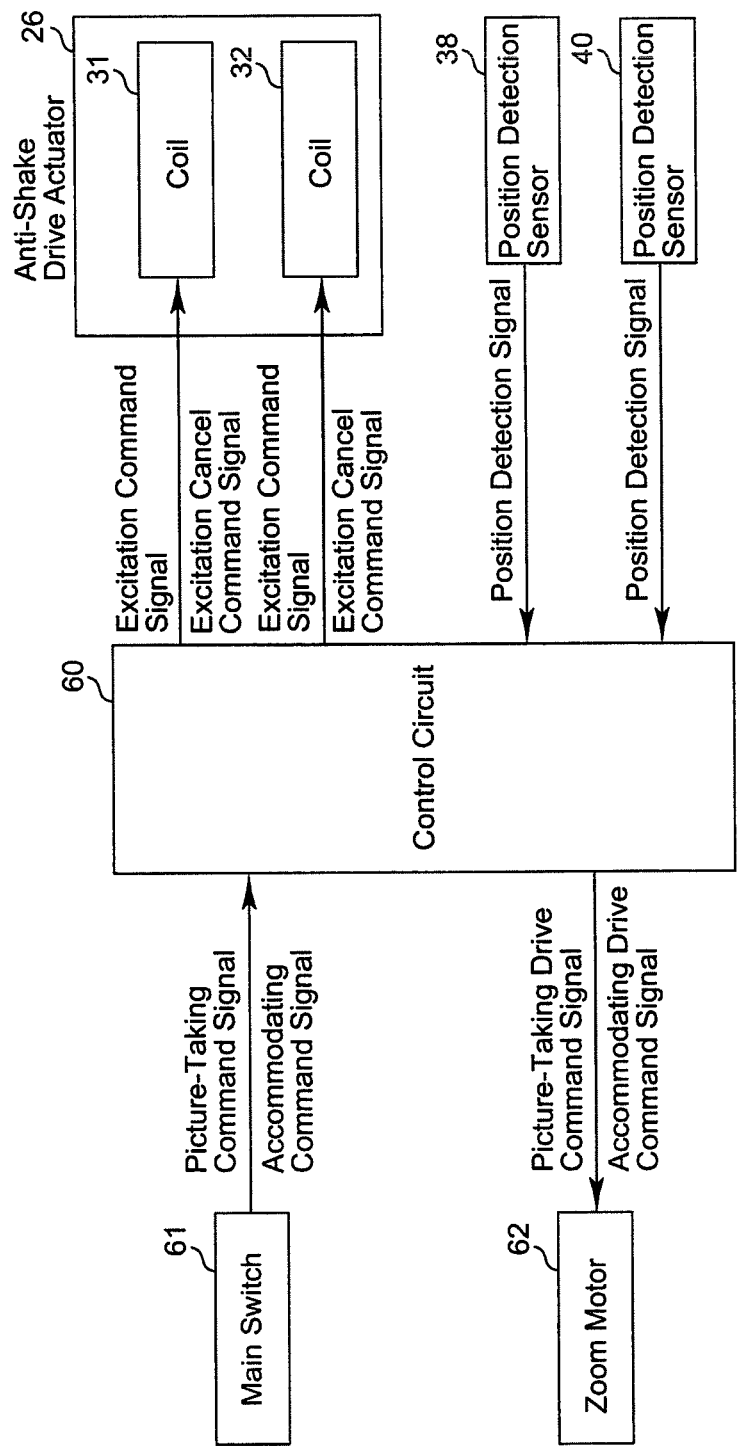
FIG. 15 is a schematic block diagram showing a circuit configuration of the lens barrel.

Although the overall structure of the lens barrel in which the anti-shake lens unit 10 is incorporated is not shown in the drawings, the linear moving ring 14 is supported inside the lens barrel thereby in a manner to be linearly movable in a direction along a photographing optical axis O of the photographing optical system, and the linear moving ring 14 is moved toward an image plane from the object side when the lens barrel is brought into a lens barrel accommodated state (fully retracted state) from a ready-to-photograph state. As shown in FIG. 15, the linear moving ring 14 moves forward when a control circuit (controller) 60 which has input a picture-taking command signal output from a main switch (inputter) 61 (upon the main switch 61 being turned ON) sends a picture-taking drive command signal to a zoom motor (main actuator) 62, and the linear moving ring 14 moves rearward when the control circuit 60 which has input a lens-accommodating command signal (accommodating command signal) output from the main switch 61 (upon the main switch 61 being turned OFF) sends a lens-accommodating drive command signal (accommodating drive command signal) to a zoom motor (main actuator) 62. The details of the control of the driving of the zoom motor 62 will be discussed later. In the following descriptions, the optical axis direction refers to a direction along or parallel to the photographing optical axis O, and the front and the rear refer to the front (object side) and the rear (image plane side) with respect to the optical axis direction. A known cam mechanism or the like can be adapted as a mechanism for moving the linear moving ring 14 in the optical axis direction.

The linear moving ring 14 is provided with a cylindrical portion 14a which surrounds the photographing optical axis O, and the shutter unit 16 is fixed to the inside of the cylindrical portion 14a. The shutter unit 16 is provided with a shutter housing 16a including a shutter (not shown) and has a photographing aperture 16b (see FIG. 1) which extends through a center of the shutter housing 16a in the optical axis direction. A shutter actuator provided in the shutter unit 16 drives the above-mentioned shutter to open and shut the photographing aperture 16b. The shutter housing 16a is provided, at three different circumferential positions on the outer periphery of the shutter housing 16a, with three spring hook projections 16c (only one of which is shown in FIGS. 1 and 2), respectively, and is provided on a rear surface thereof with two movement limit projections (movement limiter) 16d and three ball support holes 16e. The ball support holes 16e are bottomed holes which are open toward the rear (see FIG. 13).

Figure 13:
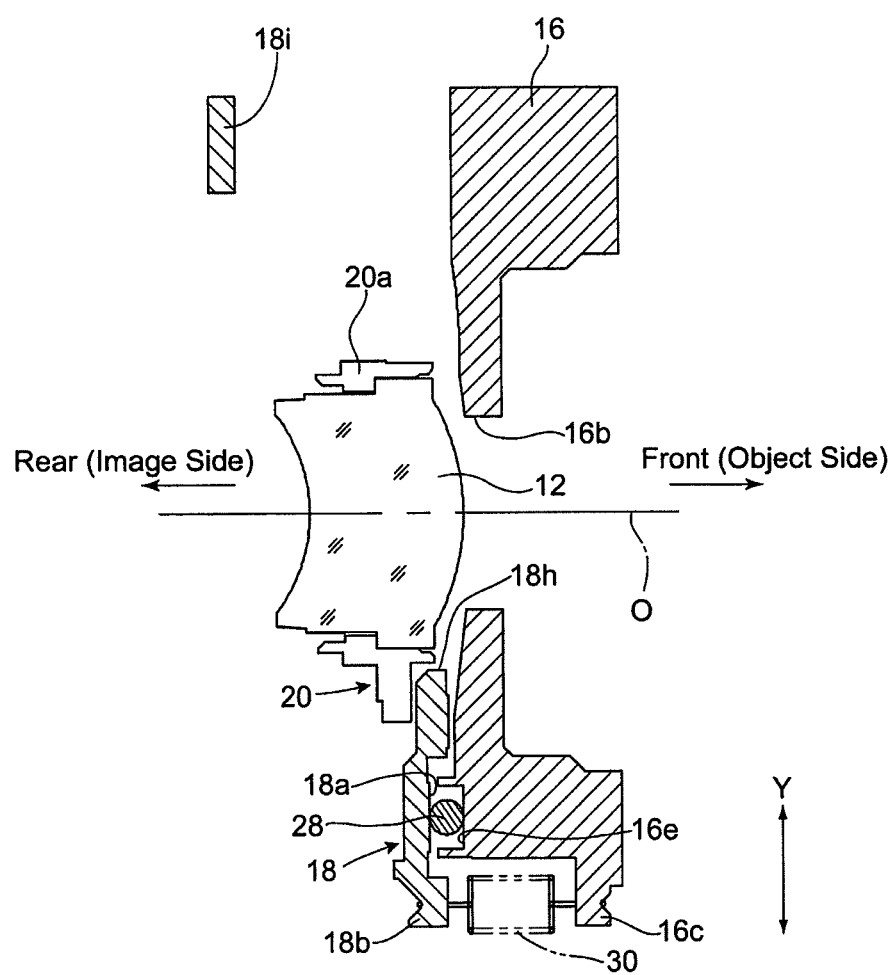
FIG. 13 is a sectional view taken along the line A-A shown in FIG. 12.

The anti-shake frame 18 is supported at the rear of the shutter unit 16. As shown in FIG. 13, three ball contact surfaces 18a are formed on the front of the anti-shake frame 18 that faces the shutter unit 16, and three guide balls (anti-shake guide members) 28 are held between the three ball contact surfaces 18a and the bottoms of the three ball support holes 16e, respectively. As mentioned above, the shutter unit 16 is provided with the three ball support holes 16e, and the three ball contact surfaces 18a and the three guide balls 28 are provided to correspond to the three ball support holes 16e. The three ball contact surfaces 18a are flat surfaces which lie in a plane substantially orthogonal to the photographing optical axis O. The three guide balls 28 are loosely fitted in the three ball support holes 16e, respectively, so that there is a clearance between each guide ball 28 and the inner wall of the associated ball support hole 16e in directions substantially orthogonal to the photographing optical axis O. When positioned in the vicinity of the center of the associated support hole 16e, each guide ball 28 does not come in contact with the inner wall of the associated ball support hole 16e.

The anti-shake frame 18 is provided, at three different circumferential positions on the outer periphery thereof, with three spring hook projections 18b, respectively, and three extension springs (anti-shake frame biasing member/first biaser) 30 are extended and installed between the three spring hook projections 18b and the three spring hook projections 16c, respectively. The anti-shake frame 18 is biased in a direction to approach the shutter unit 16 (i.e., is biased forward) by the biasing force of the three extension springs 30 to make the three ball contact surfaces 18a press against the three guide balls 28, respectively, to thereby prevent the anti-shake frame 18 from moving forward. In this state, the three ball contact surfaces 18a are in point contact with the three guide balls 28, respectively, and the anti-shake frame can freely move in directions orthogonal to the photographing optical axis O by making the three ball contact surfaces 18a slidingly contact the three guide balls 28 (or while making the three guide balls 28 roll when the three guide balls 28 are not in contact with the inner walls of the three ball support holes 16e, respectively).

The anti-shake frame 18 is further provided with two movement limit holes (movement limiter) 18c into which the two movement limit projections 16d of the shutter unit 16 are inserted, respectively. As shown in FIGS. 6 through 12, the inner wall of each movement limit hole 18c is rectangular, generally square in shape in a plane substantially orthogonal to the photographing optical axis O. In the following descriptions, the direction of one of the two diagonal lines across the inner wall of each movement limit hole 18c in a plane orthogonal to the photographing optical axis O refers to the X-axis direction and the direction of the other diagonal line refers to the Y-axis direction. The anti-shake frame 18 can freely move relative to the shutter unit 16 (the linear moving ring 14) in a plane orthogonal to the photographing optical axis O within a range until the movement limit projections 16d come into contact with the inner walls of the two movement limit holes 18c, respectively.

The anti-shake frame 18 is driven by the anti-shake drive actuator 26. The anti-shake drive actuator 26 is provided with two coils 31 and 32 which are supported by the shutter unit 16, and is further provided with two permanent magnets 34 and 36 which are supported by the anti-shake frame 18. The two permanent magnets 34 and 36 are fixed to two magnet holding portions 18d and 18e, respectively, which are provided on the anti-shake frame 18. The permanent magnets 34 and 36 are substantially identical in shape and size to each other. Each of the permanent magnets 34 and 36 is in the shape of a narrow, thin rectangular plate. The permanent magnets 34 and 36 are arranged symmetrically with respect to an imaginary plane P (see FIGS. 6 through 12) which lies on the photographing optical axis O and extends in the Y-axis direction. More specifically, opposite sides of a magnetic pole boundary line M1 (see FIGS. 8 and 11) of the permanent magnet 34 which extends in the lengthwise direction thereof and passes through an approximate center of the permanent magnet 34 with respect to the width thereof are magnetized into north and south poles, respectively, while opposite sides of a magnetic pole boundary line M2 (see FIGS. 8 and 11) of the permanent magnet 36 which extends in the lengthwise direction thereof and passes through an approximate center of the permanent magnet 36 with respect to the width thereof are magnetized into north and south poles, respectively. In other words, each of the magnetic pole boundary lines M1 and M2 define a boundary between north and south poles of each of the permanent magnets 34 and 36, respectively. The magnetic pole boundary line M1 of the permanent magnet 34 and the magnetic pole boundary line M2 of the permanent magnet 36 are inclined to each other so that the distance therebetween (i.e., the distance from the imaginary plane P) increases in an increasingly upward direction (toward a removed position of the insertable/removable frame 20 which will be discussed later) from the bottom end in the Y-axis direction (from an insertion position side of the insertable/removable frame 20 which will be discussed later). The inclination angle of each magnetic pole boundary line M1 and M2 with respect to the imaginary plane P is set to approximately 45 degrees. Namely, the lengthwise directions (the magnetic pole boundary lines M1 and M2) of the permanent magnets 34 and 36 are substantially orthogonal to each other.

Figure 8:
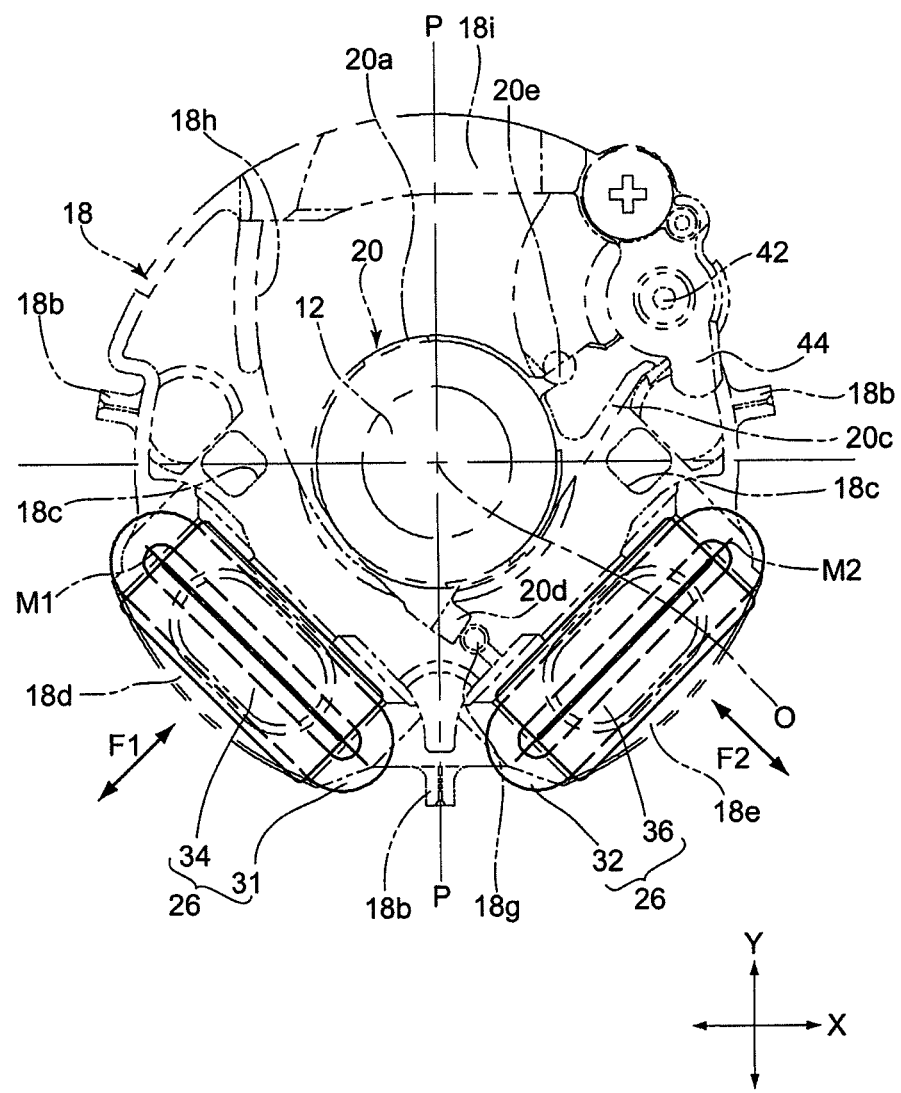
FIG. 8 is a diagram of the elements of an anti-shake drive actuator shown in FIG. 7 shown in a manner to emphasize these elements.
Figure 11:
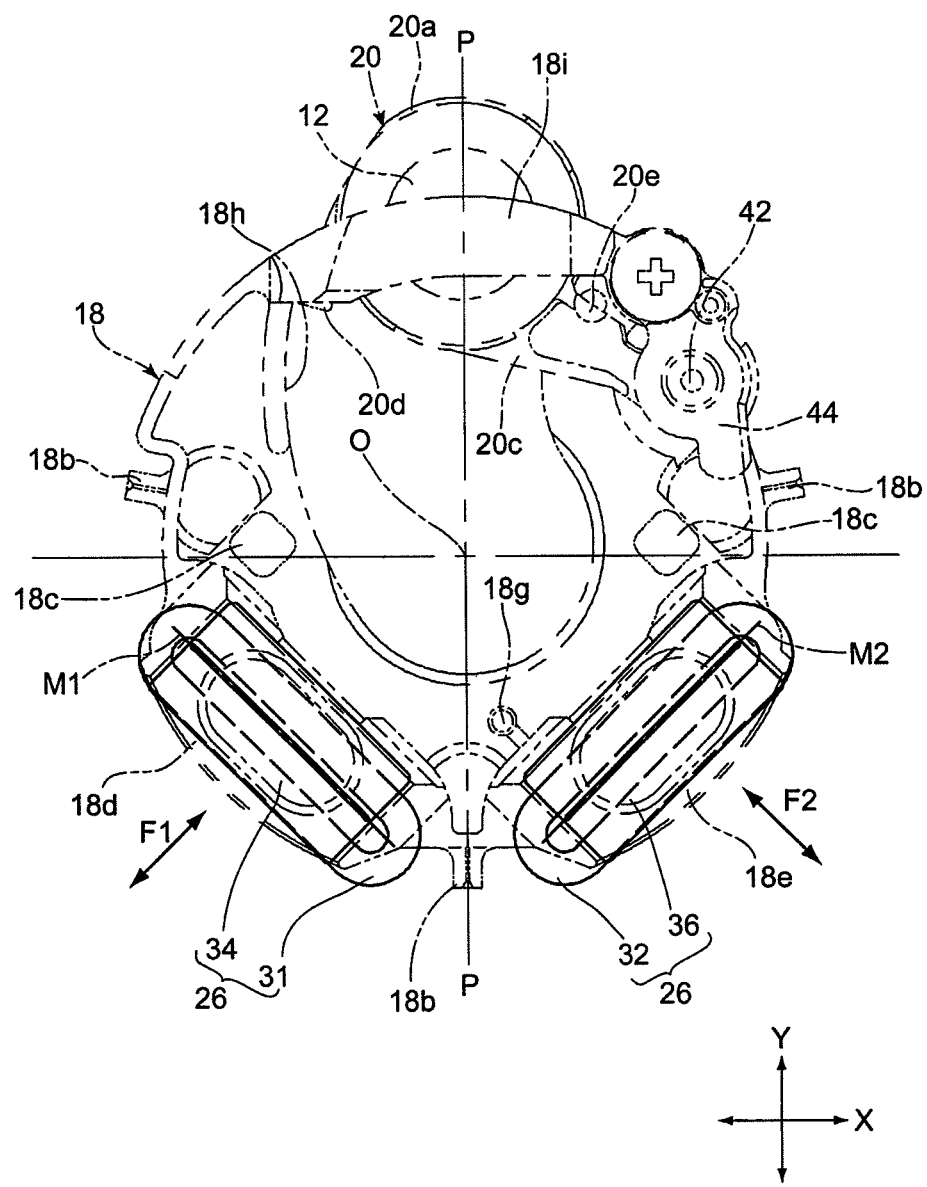
FIG. 11 is a diagram of the elements of the anti-shake drive actuator shown in FIG. 10 shown in a manner to emphasize these elements.
Figure 12:
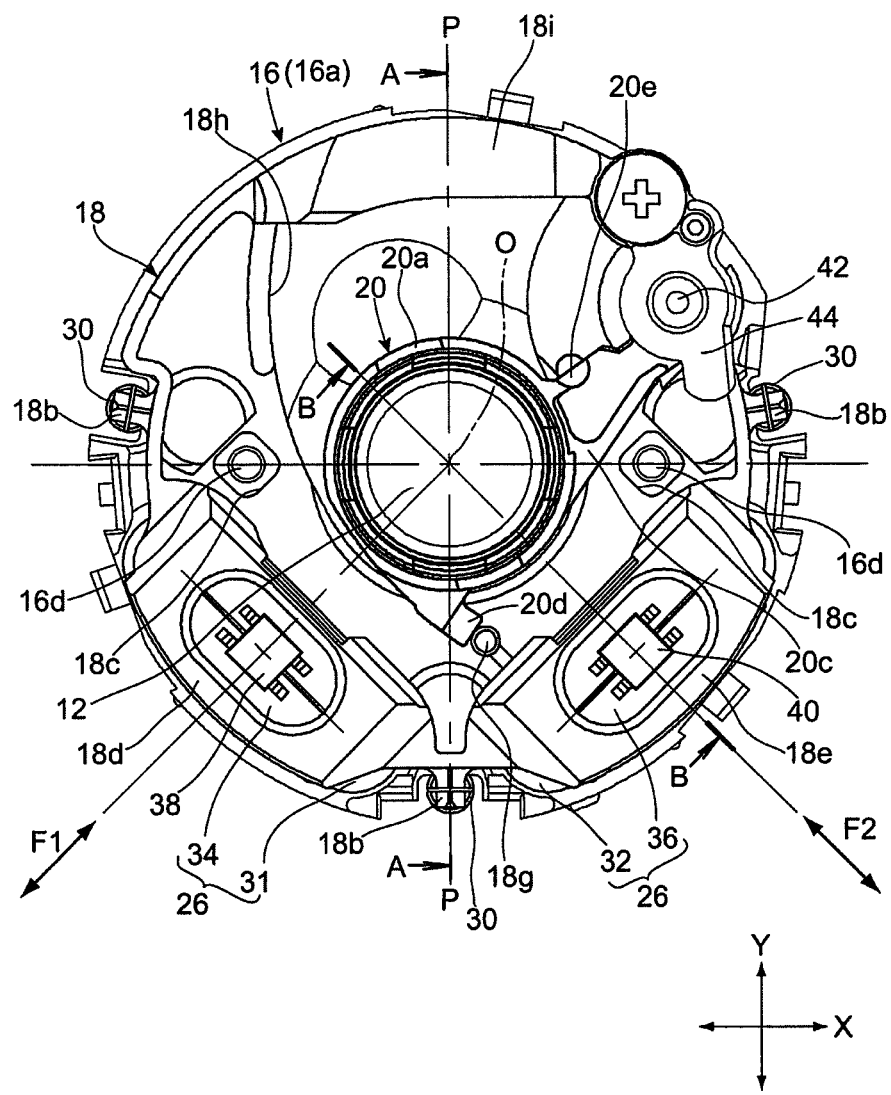
FIG. 12 is a rear elevational view of the anti-shake lens unit in the ready-to-photograph state with the linear moving ring and the sensor holder removed, viewed from the image plane side.

As shown in FIGS. 1, 8 and 11, each of the coils 31 and 32 is an air-core coil which includes a pair of elongated portions that are substantially parallel to each other and a pair of curved (U-shaped) portions which connect the pair of elongated portions at respective ends thereof. The coils 31 and 32 are substantially identical in shape and size to each other. The shutter housing 16a is provided on the rear thereof with a pair of positioning projections 16f and a pair of positioning projections 16g (see FIG. 1). The coil 31 is supported on the shutter unit 16 with the pair of positioning projections 16f engaged into the air-core portion of the coil 31, and the coil 32 is supported on the shutter unit 16 with the pair of positioning projections 16g engaged into the air-core portion of the coil 32. In this supporting state, the lengthwise direction of the coil 31 is substantially parallel to the magnetic pole boundary line M1 and the lengthwise direction of the coil 32 is substantially parallel to the magnetic pole boundary line M2. As shown in FIG. 15, the coils 31 and 32 are connected to the control circuit 60 on a control circuit board of the lens shutter camera, in which the present embodiment of the anti-shake lens unit 10 is incorporated, via a flexible PWB (not shown) which extends from the shutter unit 16. The passage of current through the coils 31 and 32 is controlled by the control circuit 60 in accordance with an excitation command signal or an excitation cancel command signal. The details of the control of the excitation current of the coils 31 and 32 (the anti-shake drive actuator 26) by the control circuit 60 will be discussed later.

Figure 14:
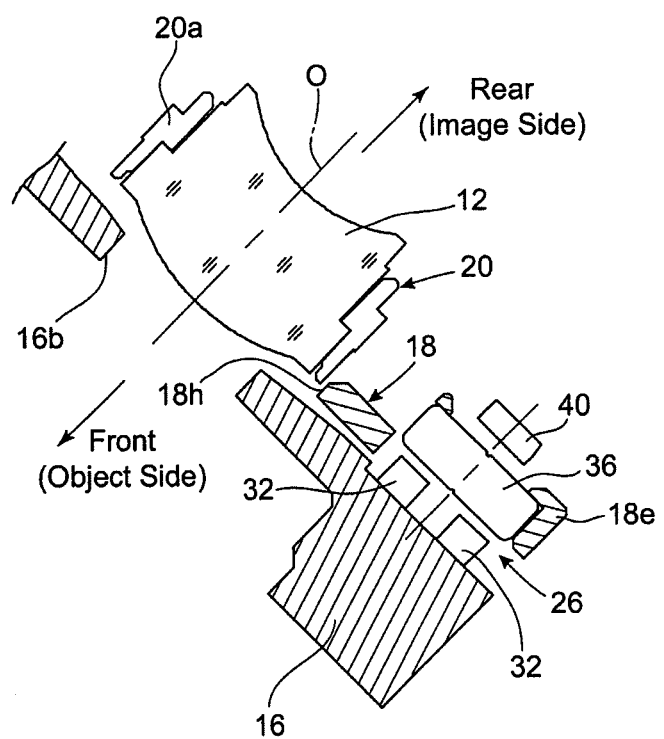
FIG. 14 is a sectional view taken along the line B-B shown in FIG. 12.

In the anti-shake drive actuator 26 that has the above described structure, the coil 31 and the permanent magnet 34 face each other in the optical axis direction, and a driving force is generated in a direction substantially orthogonal to the magnetic pole boundary line M1 of the permanent magnet 34 (i.e., orthogonal to the lengthwise direction of the coil 31) in a plane orthogonal to the photographing optical axis O upon the coil 31 being energized. The direction of action of this driving force is shown by a double-headed arrow F1 in FIGS. 8, 11 and 12. In addition, the coil 32 and the permanent magnet 36 face each other in the optical axis direction as shown in FIG. 14, and a driving force is generated in a direction substantially orthogonal to the magnetic pole boundary line M2 of the permanent magnet 36 (i.e., orthogonal to the lengthwise direction of the coil 32) in a plane orthogonal to the photographing optical axis O upon the coil 32 being energized. The direction of action of this driving force is shown by a double-headed arrow F2 in FIGS. 8, 11 and 12. The direction of action of each of the two aforementioned driving forces intersects both the X-axis direction and the Y-axis direction at an angle of approximately 45 degrees, so that the anti-shake frame 18 can be moved to any arbitrary position in a plane orthogonal to the photographing optical axis O by controlling the passage of current through each of the coils 31 and 32. As described above, the moving range of the anti-shake frame 18 is limited by engagement of the inner walls of the two movement limit holes 18c with the two movement limit projections 16d, respectively.

The sensor holder 22 is fixed to the rear of the anti-shake frame 18. The sensor holder 22 has a shape covering the rear sides of the two magnet holding portions 18d and 18e and supports two position detection sensors 38 and 40 that are respectively positioned behind the two permanent magnets 34 and 36. The position detection sensors 38 and 40 are connected to the aforementioned flexible PWB (not shown), which extends from the shutter unit 16, and are further connected to the aforementioned control circuit board of the camera, in which the present embodiment of the anti-shake lens unit 10 is incorporated, via the aforementioned other flexible PWB (not shown) provided inside the lens barrel. The drive position of the anti-shake frame 18 that is driven by the anti-shake drive actuator 26 can be detected via the position detection sensors 38 and 40. As shown in FIG. 15, the position detection sensors 38 and 40 are connected to the control circuit 60 on the control circuit board of the camera via the flexible PWB (not shown) that extends from the shutter unit 16 to output signals (position detection signals) indicating detected positions of the anti-shake frame 18 to the control circuit 60.

The anti-shake lens unit 10 is provided with an insertable/removable frame 20 which is supported by the anti-shake frame 18 thereon to be rotatable (swingable) about a rotational shaft 42 that extends parallel to the photographing optical axis O. The front end of the rotational shaft 42 is fixedly fitted into a shaft support hole 18f formed in the anti-shake frame 18, and the rear end of the rotational shaft 42 is fixed to a retaining member 44 fixed to the anti-shake frame 18. The insertable/removable frame 20 is provided with a cylindrical lens holder portion 20a, a shaft bearing portion 20b and an arm portion 20c. The cylindrical lens holder portion 20a holds the insertable/removable image-stabilizing lens 12, the rotational shaft 42 is inserted into the shaft bearing portion 20b, and the cylindrical lens holder portion 20a and the shaft bearing portion 20b are connected via the arm portion 20c. The insertable/removable frame 20 is swingable (rotatable) about the rotational shaft 42 between the insertion position shown in FIGS. 2 through 8 and 12 and the removed position shown in FIGS. 9 through 11, and the insertion position is defined by engagement of a stopper contact portion 20d formed on the cylindrical lens holder portion 20a with a stopper 18g formed on the anti-shake frame 18. The insertable/removable frame 20 is biased toward the insertion position by an insertable/removable frame biasing spring (insertable/removable-frame biasing member/second biaser) 46. The insertable/removable frame biasing spring 46 is configured of a torsion coil spring, the ends of which are hooked onto the anti-shake frame 18 and the insertable/removable frame 20, respectively. In addition, an optical-axis-direction biasing spring 48 configured of a compression spring is installed between the shaft bearing portion 20b and the retaining member 44, and the insertable/removable frame 20 is biased forward by the optical-axis-direction biasing spring 48 so that the position of the insertable/removable frame 20 in the optical axis direction is stabilized.

When the insertable/removable frame 20 is in the insertion position, the insertable/removable image-stabilizing lens 12 is positioned on the photographing optical axis O. When the insertable/removable frame 20 rotates to the removed position in a state where the anti-shake frame 18 is at the movement limit thereof in the Y-axis direction (hereinafter referred to as the removal assisting position), in which the end of the inner wall of the movement limit holes 18c of the anti-shake frame 18 on the insertion position side (the lower end of the inner wall of each movement limit hole 18c with respect to FIGS. 6 through 12) comes into contact with the associated movement limit projection 16d, the center of the insertable/removable image-stabilizing lens 12 is displaced from the photographing optical axis O in the Y-axis direction. A clearance hole 18h, the shape of which corresponds to the path of movement of the cylindrical lens holder portion 20a that is defined by the arc-shaped path about the rotational shaft 42, is formed through the anti-shake frame 18, and the front end of the cylindrical lens holder portion 20a is positioned in the clearance hole 18h when the insertable/removable frame 20 is at the removed position. The clearance hole 18h is open at (extends through) a portion of the outer periphery of the anti-shake frame 18, and the anti-shake frame 18 is provided over this opening portion with a reinforcing bridge 18i. As can be seen in FIGS. 1 and 2, the reinforcing bridge 18i is offset rearwardly to be prevented from interfering with the cylindrical lens holder portion 20a when the insertable/removable frame 20 rotates to the removed position.

The removal drive lever 24 is positioned in the linear moving ring 14 and supported thereby to be rotatable (swingable) about a rotational shaft 50 that is parallel to the photographing optical axis O. The rotational shaft 50 is formed integral with the linear moving ring 14 so as to be positioned in the vicinity of the rotational shaft 42. The rotational shaft 50 is inserted into a shaft hole formed through a shaft bearing portion 24a of the removal drive lever 24. A retaining plate 52 is fixed to the rear of the linear moving ring 14 to prevent the removal drive lever 24 from moving rearward. The removal drive lever 24 is provided with an arm portion 24b which extends radially from the shaft bearing portion 24a and is further provided in the vicinity of the free end of the arm portion 24b with a removal pressing portion 24c that is capable of coming into contact with a pressing-force receiving part 20e formed on the arm portion 20c of the insertable/removable frame 20.

Figure 6:
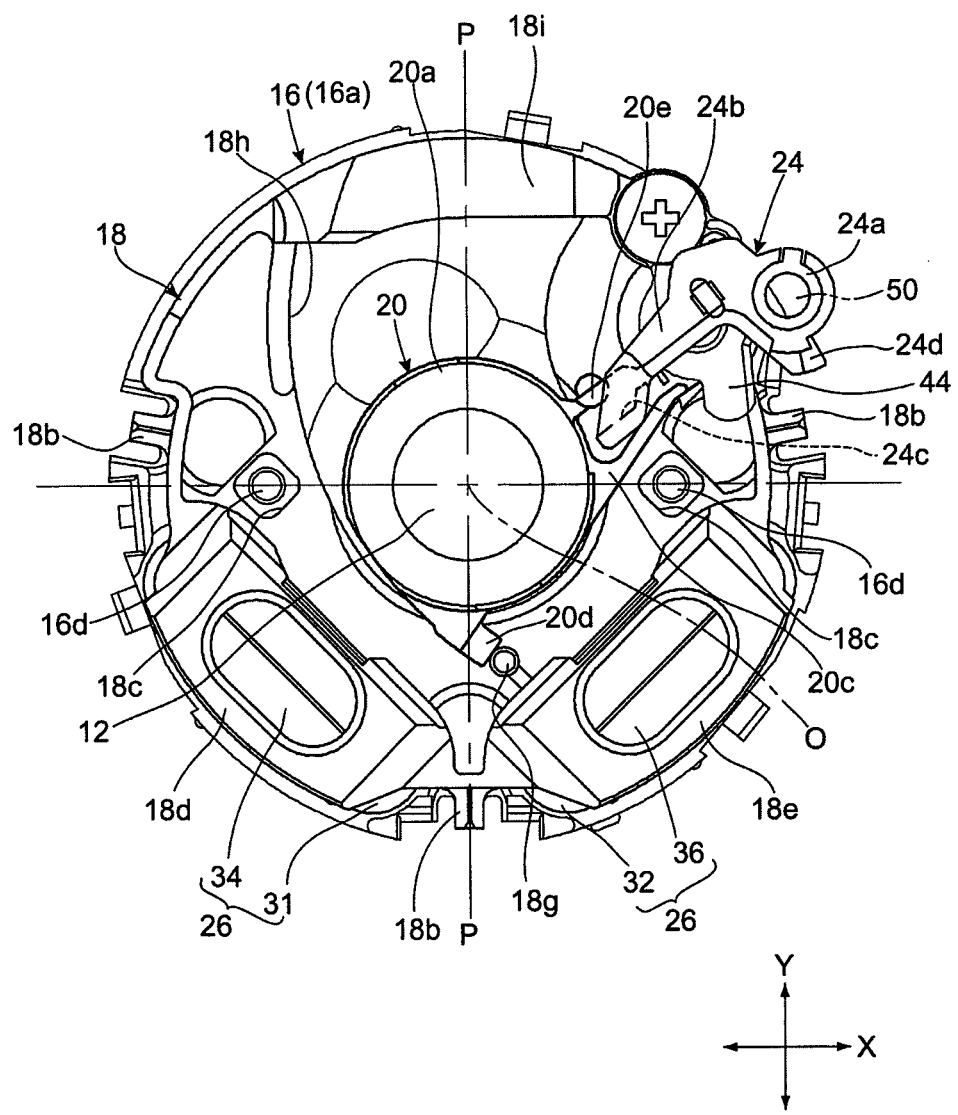
FIG. 6 is a rear elevational view of part of the anti-shake lens unit in the ready-to-photograph state of the lens barrel, viewed from the image plane side.

The biasing force of the insertable/removable frame biasing spring 46 urges the insertable/removable frame 20 to rotate toward the insertion position from the removed position (counterclockwise direction with respect to FIGS. 6 through 12), and the removal drive lever 24 is also biased to rotate in the same direction (counterclockwise direction with respect to FIGS. 6 through 12) by a removal drive lever biasing spring 54. A stopper (not shown) which determines the rotation limit of the removal drive lever 24 in the biasing direction of the removal drive lever biasing spring 54 is formed on the inside of the linear moving ring 14. On the other hand, rotation of the insertable/removable frame 20 in the biasing direction of the insertable/removable frame biasing spring 46 is limited by engagement between the stopper contact portion 20d and the stopper 18g. FIG. 6 shows a state where the insertable/removable frame 20 and the removal drive lever 24 are in contact with the stopper 18g and the aforementioned stopper (not shown) of the linear moving ring 14, respectively, and at this stage the pressing-force receiving part 20e and the removal pressing portion 24c are spaced from each other (see FIGS. 4 and 5). The clearance between the pressing-force receiving part 20e and the removal pressing portion 24c is determined to be such a degree as to prevent the pressing-force receiving part 20e from coming in contact with the removal pressing portion 24c in the moving range of the anti-shake frame 18 relative to the shutter unit 16 (i.e., the aforementioned range until the movement limit projections 16d come into contact with the inner walls of the two movement limit holes 18c, respectively). In other words, the anti-shake lens unit 10 is configured so that the removal drive lever 24 does not interfere with either of the anti-shake driving operations of the anti-shake frame 18 and the insertable/removable frame 20 that are performed by the anti-shake drive actuator 26. If no external force is exerted on the insertable/removable frame 20 and the removal drive lever 24, the state shown in FIGS. 6 through 8, in which the insertable/removable frame 20 is held in the insertion position by the biasing force of the insertable/removable frame biasing spring 46, is maintained.

The removal drive lever 24 is provided in the vicinity of the shaft bearing portion 24a with a pressing-force receiving part 24d. A insertion/removal control-projection (removal drive mechanism/pressing member) 58 (see FIG. 3) is a stationary member which is fixed to the inside of the lens barrel to be positioned behind the removal drive lever 24. Rearward movement of the linear moving ring 14 when the lens barrel moves from a ready-to-photograph state to the lens barrel accommodated state causes the insertion/removal control-projection 58 to come into contact with and press the pressing-force receiving part 24d to rotate the removal drive lever 24 in a direction toward the removed position of the insertable/removable frame 20 from the insertion position of the insertable/removable frame 20. More specifically, the insertion/removal control-projection 58 is provided at the front end thereof with an end-face cam 58a, and retracting movement of the linear moving ring 14 toward the insertion/removal control-projection 58 causes the pressing-force receiving part 24d to come into contact with the end-face cam 58a. Subsequently, a further retracting movement of the linear moving ring 14 with the pressing-force receiving part 24d remaining in contact with the end-face cam 58a causes a component force which makes the removal drive lever 24 rotate in a direction against the biasing force of the removal drive lever biasing spring 54 (in a direction toward the removed position of the insertable/removable frame 20) created from the rearward moving force of the linear moving ring 14 in the optical axis direction, so that the removal drive lever 24 solely rotates by an amount of rotation corresponding to the aforementioned clearance, which causes the removal pressing portion 24c to come into contact with the pressing-force receiving part 20e of the insertable/removable frame 20. Thereupon, the pressing force in the direction toward the removed position of the insertable/removable frame 20 is transmitted to the insertable/removable frame 20 via the removal pressing portion 24c and the pressing-force receiving part 20e, which causes the removal drive lever 24 to press and rotate the insertable/removable frame 20 toward the removed position against the biasing forces of both the insertable/removable frame biasing spring 46 and the removal drive lever biasing spring 54. After the insertable/removable frame 20 reaches the removed position, a removed-lens holding surface 58b which is formed on a side of the insertion/removal control-projection 58 to extend substantially parallel to the optical axis O is engaged with a side of the pressing-force receiving part 24d, so that the insertable/removable frame 20 is held in the removed position (see FIG. 9).

Figure 16:
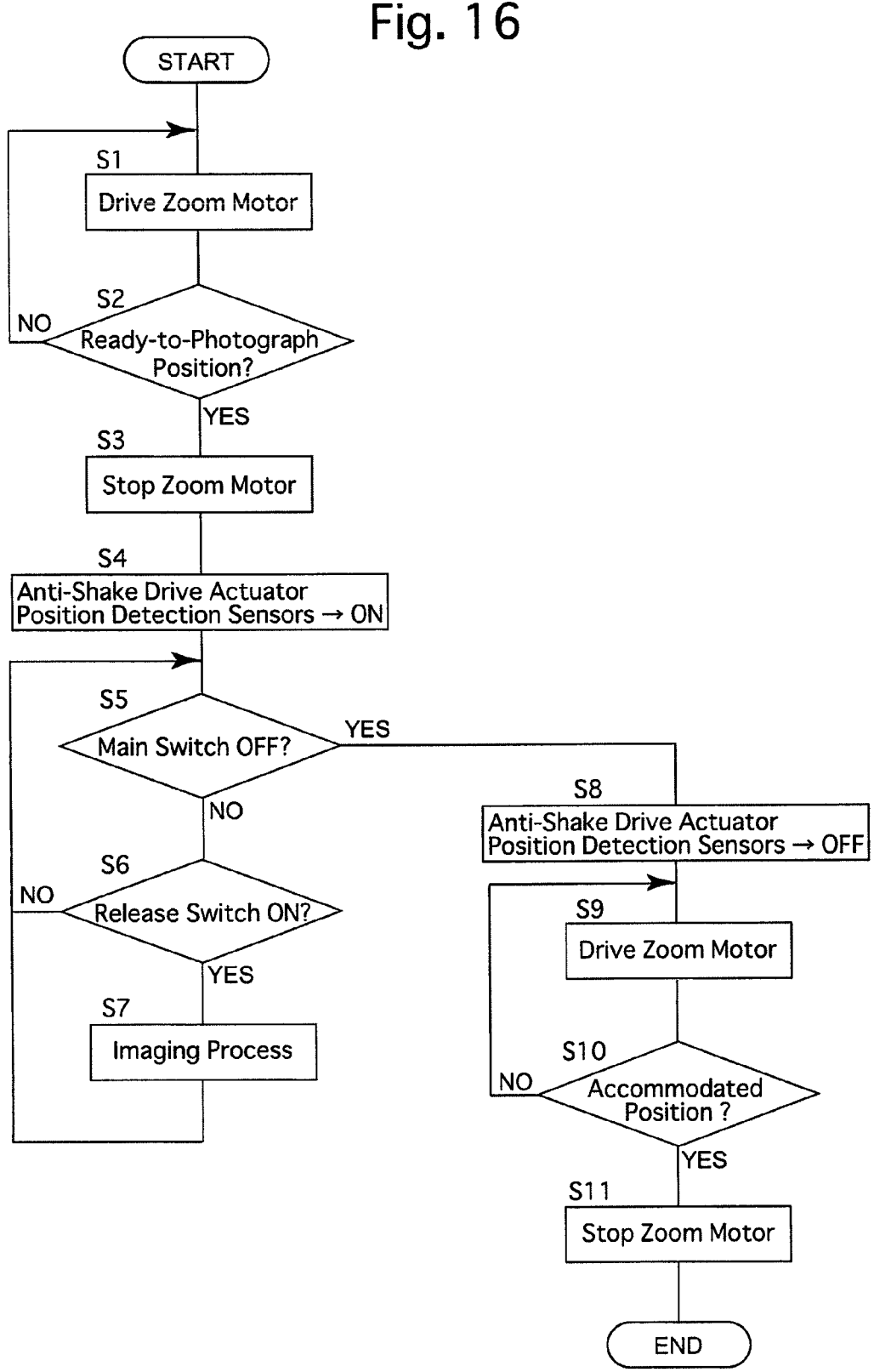
FIG. 16 is a flow chart for illustrating the control of the driving of a zoom motor (main actuator) and the coils (anti-shake drive actuator)

Operations of the anti-shake lens unit 10 which are performed during the period of time from the moment at which the lens barrel moves from the lens barrel accommodated state to a ready-to-photograph state until the moment at which the lens barrel moves back to the lens barrel accommodated state will be hereinafter discussed with reference to FIGS. 15 and 16. The flow chart shown in FIG. 16 shows the control of the driving of the zoom motor 62 and the coils 31 and 32 (the anti-shake drive actuator 26) by control circuit 60 during the period of time the lens barrel moves from the lens barrel accommodated state to a ready-to-photograph state and back to the lens barrel accommodated state.

When the lens barrel is in the lens barrel accommodated state, the positional relationship between the insertion/removal control-projection 58 and the removal drive lever 24 is such that the removed-lens holding surface 58b is in contact with the pressing-force receiving part 24d so that the insertable/removable frame 20 together with the removal drive lever 24 is held in the removed position by the insertion/removal control-projection 58 to thereby be prevented from rotating toward the insertion position, while the insertable/removable image-stabilizing lens 12 is removed from a position on an optical path (the photographing optical axis O).

Upon the main switch 61 being turned ON when the lens barrel is in the lens barrel accommodated state, the picture-taking command signal is sent from the main switch 61 to the control circuit 60. Upon reception of the picture-taking command signal from the main switch 61, the control circuit 60 sends the picture-taking drive command signal (forward-rotation command signal) to the zoom motor 62 to drive and rotate the zoom motor 62 (in a forward rotational direction) (step S1). The zoom motor 62 continues to be driven to rotate until the lens barrel moves to a ready-to-photograph state (NO at step S2, and step S1), and is stopped rotating upon the lens barrel moving to a ready-to-photograph state (YES at step S2, and step S3).

This rotational driving of the zoom motor 62 to move the lens barrel from the lens barrel accommodated state to a ready-to-photograph state causes the anti-shake lens unit 10 (the linear moving ring 14 and the shutter unit 16) to move forward in the optical axis direction to thereby release the pressing force of the insertion/removal control-projection 58 against the removal drive lever 24, which causes the removal drive lever 24 to return to the position shown in FIG. 6 by the biasing force of the removal drive lever biasing spring 54. Thereupon, the biasing force of the insertable/removable frame biasing spring 46 causes the insertable/removable frame 20 to rotate from the removed position to the insertion position. In association with this rotation, the holding of the anti-shake frame 18 in the removal assisting position is also released.

Upon the lens barrel moving to a ready-to-photograph state, the control circuit 60 sends the aforementioned excitation command signal to the coils 31 and 32 to excite the coils 31 and 32 to thereby bring the anti-shake drive actuator 26 into a driving state and turns each of the position detection sensors 38 and 40 ON (step S4). In the present embodiment, the anti-shake frame 18 is driven to correct image shake by maintaining the anti-shake drive actuator 26 in a driving state and also maintaining each of the position detection sensors 38 and 40 in an ON state at all times when the lens barrel is in a ready-to-photograph state.

Figure 7:
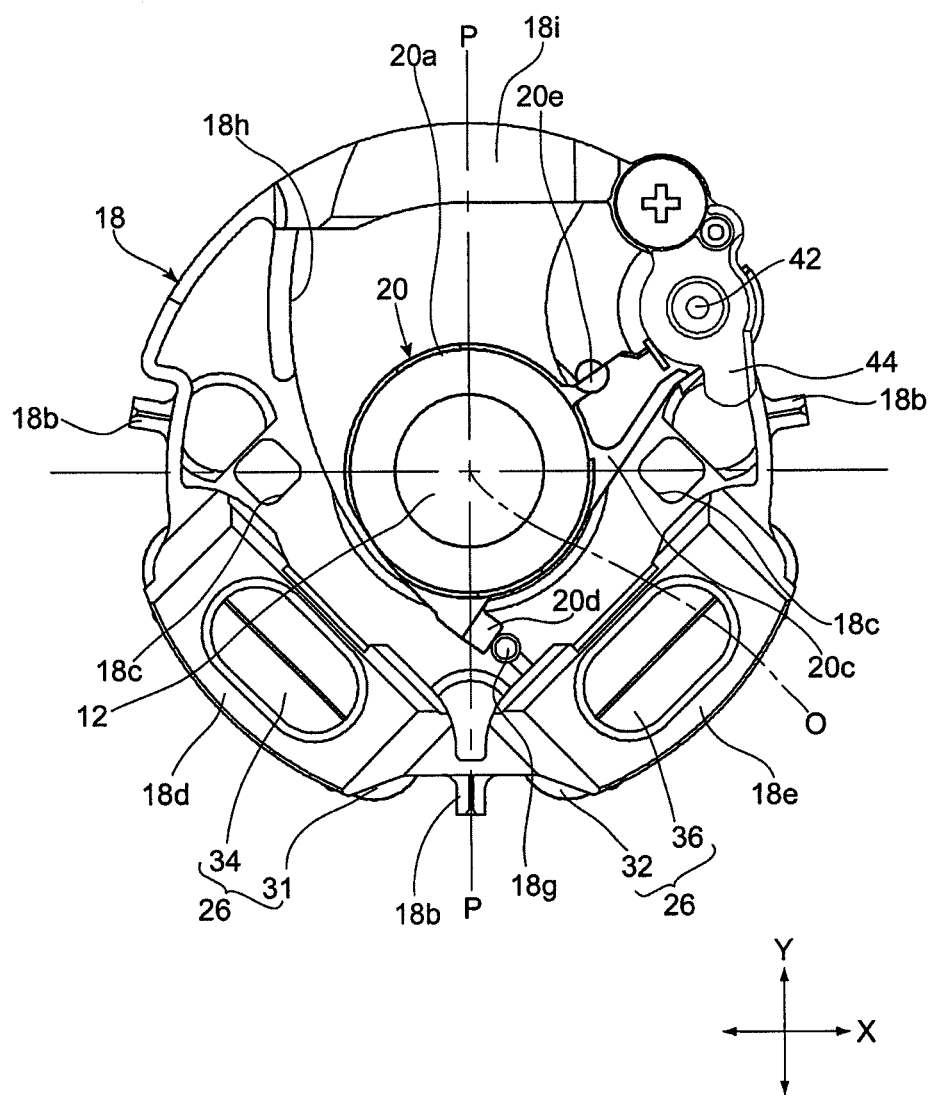
FIG. 7 is a rear elevational view that shows elements of the anti-shake lens unit shown in FIG. 6 which are driven during an image-stabilizing operation and coils shown in FIG. 6.

In a ready-to-photograph state shown in FIGS. 6 through 8, the insertable/removable frame 20 is held at the insertion position by the biasing force of the insertable/removable frame biasing spring 46, and the center (optical axis) of the insertable/removable image-stabilizing lens 12 is coincident with the photographing optical axis O. In this ready-to-photograph state, deviations (image shake) of an object image focused on an image plane can be corrected by driving the insertable/removable image-stabilizing lens 12 in directions orthogonal to the photographing optical axis O by driving the anti-shake frame 18 in a plane orthogonal to the optical axis O via the anti-shake drive actuator 26 in accordance with the direction and magnitude of vibrations applied to the lens barrel. More specifically, the angular velocities of the lens barrel are detected by gyro sensors, and are time-integrated to determine a moving angle, and subsequently, from this moving angle, the moving amounts of the image on the focal plane in the X-axis direction and in the Y-axis direction are calculated while the driving amounts and the driving directions of the insertable/removable image-stabilizing lens 12 (the anti-shake frame 18) for the respective axial directions are calculated in order to cancel out the image shake. Subsequently, the passage of current through each of the coils 31 and 32 is controlled in accordance with these calculated values. Thereupon, the anti-shake frame 18 is moved while being supported by the three guide balls 28 at the three ball contact surfaces 18a. When the anti-shake frame 18 is driven to perform an anti-shake driving operation, the insertable/removable frame 20 is held in the insertion position, in which the stopper contact portion 20d is made to contact the stopper 18g, so that the anti-shake frame 18 and the insertable/removable frame 20 (the insertable/removable image-stabilizing lens 12) integrally move.

In a ready-to-photograph state, it is possible to calibrate the position detection sensors 38 and 40 by utilizing information on the positions of movement limits of the anti-shake frame 18 at which each of the two movement limit projections 16d comes into contact with the inner wall of the associated movement limit hole 18c of the anti-shake frame 18. The direction of action of each of the two driving forces F1 and F2, which are respectively generated by a combination of the coil 31 and the permanent magnet 34 and a combination of the coil 32 and the permanent magnet 36, intersects both the X-axis direction and the Y-axis direction at an angle of approximately 45 degrees. Accordingly, the movement limits of each movement limit hole 18c in the X-axis direction relative to the associated movement limit projection 16d (defined by each laterally opposed corner (end) of each movement limit hole 18c coming into contact with the associated movement limit projection 16d) can be used as reference positions for driving the anti-shake frame 18 in the X-axis direction by the anti-shake drive actuator 26, and the movement limits of each movement limit hole 18c in the Y-axis direction relative to the associated movement limit projection 16d (defined by each vertically opposed corner (end) of each movement limit hole 18c coming into contact with the associated movement limit projection 16d) can be used as reference positions for driving the anti-shake frame 18 in the Y-axis direction by the anti-shake drive actuator 26. A practical anti-shake driving range of the anti-shake frame 18 in a ready-to-photograph state is defined within a range in which each movement limit projection 16d does not come into contact with the inner wall of the associated movement limit hole 18c.

Upon a release switch (not shown) being depressed halfway, in a ready-to-photograph state of the lens barrel with the main switch 61 ON, an auto-focus operation and auto-exposure operation are performed. Subsequently, upon this release switch being fully depressed (NO at step S5, and YES at step S6), an imaging process to capture an object image using an image sensor (not shown) is performed (step S7).

Subsequently, upon the main switch 61 being turned OFF in a ready-to-photograph state of the lens barrel (YES at step S5), the aforementioned lens-accommodating command signal is sent from the main switch 61 to the control circuit 60. The control circuit 60 which has received the lens-accommodating command signal from the main switch 61 firstly sends the excitation cancel command signal to the coils 31 and 32 and thereafter sends the lens-accommodating drive command signal (reverse rotation command signal) to the zoom motor 62. The period of time from the moment at which the control circuit 60 issues the excitation cancel command signal to the moment at which the passage of current through the coils 31 and 32 is shut off is shorter than the period of time from the moment at which the control circuit 60 issues the lens-accommodating drive command signal to the moment at which the rotational driving (reverse rotational driving) of the zoom motor 62 commences, and accordingly, the passage of current through the coils 31 and 32 is shut off so that the anti-shake drive actuator 26 is switched to a non-driving state (step S8) and thereafter the reverse rotational driving of the zoom motor 62 is started (step S9). Additionally, the control circuit 60 switches each of the position detection sensors 38 and 40 to an OFF state before the commencement of the reverse rotational driving of the zoom motor 62 (step S8). The zoom motor 62 continues to be driven to rotate until the lens barrel moves to the lens barrel accommodated state (NO at step S10, and step S9), and this driving of the zoom motor 62 is stopped upon the lens barrel moving to the lens barrel accommodated state (YES at step S10, and step S11).

This rotational driving of the zoom motor 62 from a ready-to-photograph state to the lens barrel accommodated state causes the anti-shake lens unit 10 (the linear moving ring 14 and the shutter unit 16) to move rearward in the optical axis direction, and in a short time the pressing-force receiving part 24d of the removal drive lever 24 which retracts with the linear moving ring 14 comes in contact with the end-face cam 58a of the insertion/removal control-projection 58. A further rearward movement of the linear moving ring 14 causes the pressing-force receiving part 24d to be pressed by the end-face cam 58a. Thereupon, a component force is produced from the retracting force of the linear moving ring 14, so that the removal drive lever 24 is rotated against the biasing force of the removal drive lever biasing spring 54 to thereby cause the removal pressing portion 24c to come into contact with the pressing-force receiving part 20e. The insertable/removable frame 20 is acted upon by a biasing force of the insertable/removable frame biasing spring 46 toward the insertion position as described above, and the removal drive lever 24 with the removal pressing portion 24c in contact with the pressing-force receiving part 20e presses the insertable/removable frame 20 toward the removed position from the insertion position against the biasing force of the insertable/removable frame biasing spring 46. In addition, the anti-shake frame 18, which supports the insertable/removable frame 20, is acted upon by the biasing force of the three extension springs 30 in a direction to press the three ball contact surfaces 18a against the three guide balls 28. Namely, the insertable/removable frame biasing spring 46 and the extension springs 30 exert spring resistance on movements of the insertable/removable frame 20 and the anti-shake frame 18, respectively. The rotational resistance of the insertable/removable frame 20 that is caused by the insertable/removable frame biasing spring 46 is predetermined to be greater than the resistance to movement of the anti-shake frame 18 that is caused by the extension springs 30. Therefore, the pressing force acting on the insertable/removable frame 20 is transmitted to the anti-shake frame 18, thus causing the anti-shake frame 18 to move with the insertable/removable frame 20 toward the removed position before the commencement of rotation of the insertable/removable frame 20 toward the removed position. Subsequently, the anti-shake frame 18 is moved to the removal assisting position (shown in FIGS. 9 through 11), in which the end of the inner wall of each of the two movement limit holes 18c of the anti-shake frame 18 on the insertion position side of the insertable/removable frame 20 in the Y-axis direction (i.e., the lower end of each of the two movement limit holes 18c of the anti-shake frame 18 with respect to FIGS. 6 through 12) comes into contact with the associated movement limit projection 16d. Since the aforementioned practical anti-shake driving range of the anti-shake frame 18 in a ready-to-photograph state includes no points where the inner wall of each movement limit hole 18c comes into contact with the associated movement limit projection 16d as described above, the removal assisting position is positioned outside the aforementioned practical anti-shake driving range. Immediately after the anti-shake frame 18 is prevented from moving beyond the removal assisting position after reaching the removal assisting position, the insertable/removable frame 20 is solely rotated from the insertion position to the removed position. Accordingly, the movement of the insertable/removable image-stabilizing lens 12 to the removed position thereof (shown in FIGS. 9 through 11) is performed as the result of a combination of the movement of the anti-shake frame 18 to the removal assisting position in the Y-axis direction and the rotation of the insertable/removable frame 20 to the removed position.

Figure 9:
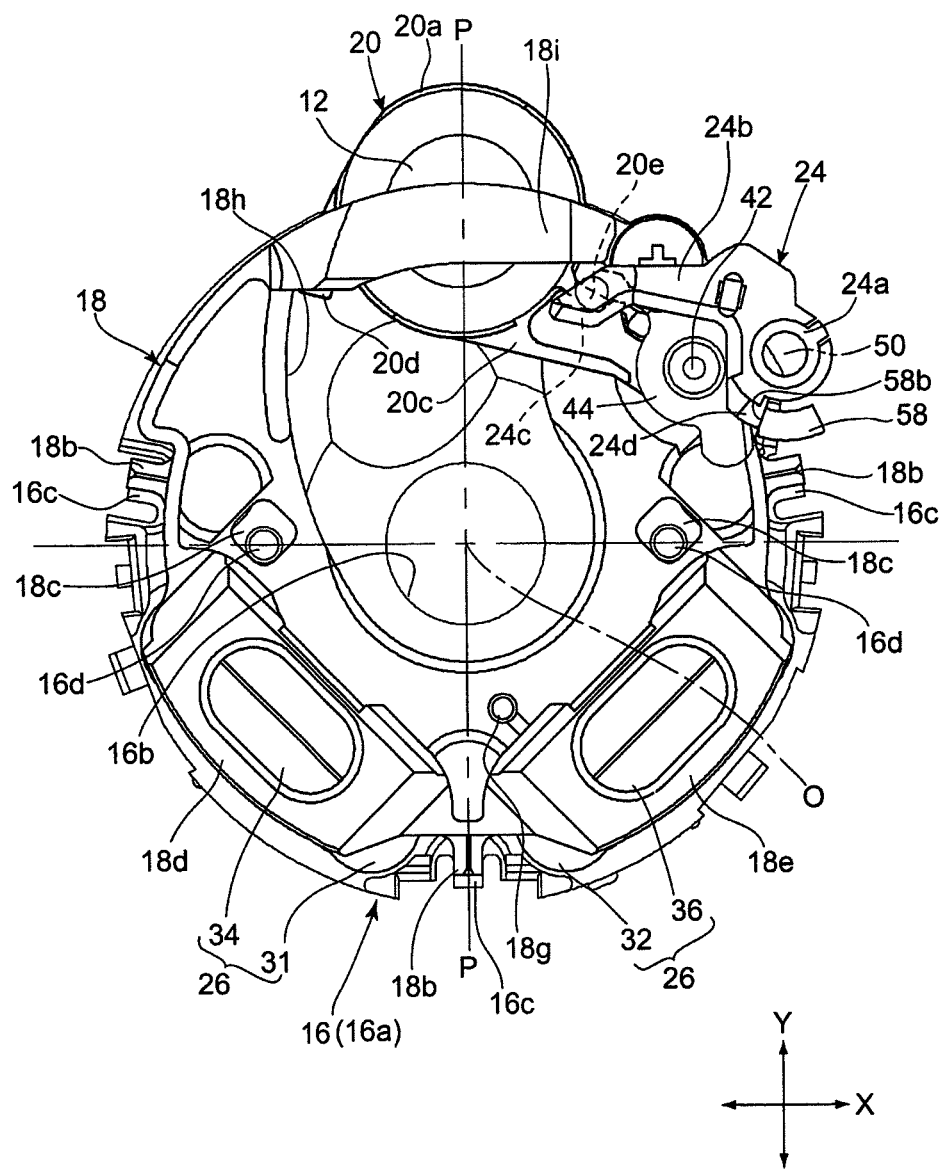
FIG. 9 is a rear elevational view of the portion of the anti-shake lens unit shown in FIG. 6 in a lens barrel accommodated state (fully-retracted state) of the lens barrel.
Figure 10:
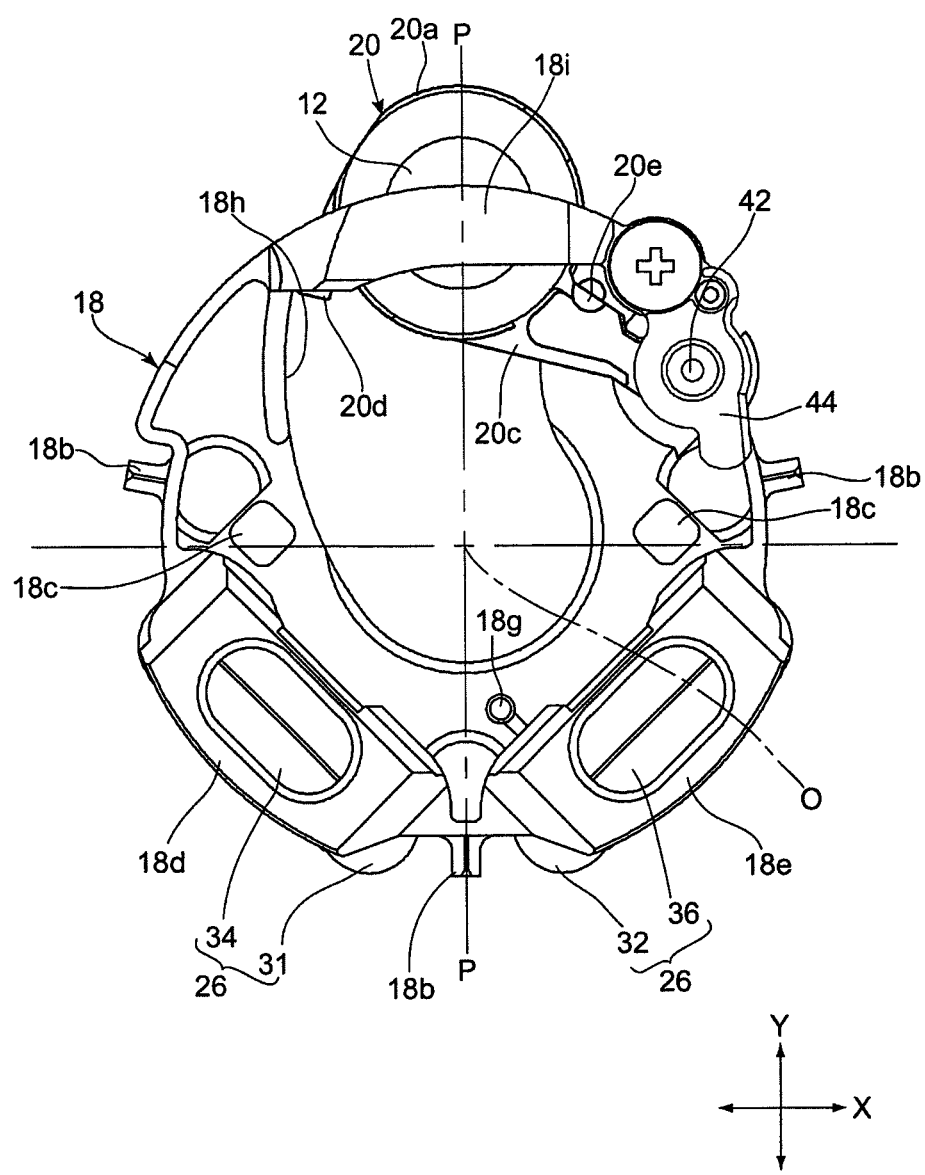
FIG. 10 is a rear elevational view of elements of the anti-shake lens unit shown in FIG. 9 which are driven during an image-stabilizing operation and the coils shown in FIG. 9.

The insertable/removable image-stabilizing lens 12 is removed from a position on an optical path (the photographing optical axis O) as shown in FIGS. 9 through 11 due to the movement of the anti-shake frame 18 to the removal assisting position and the rotation of the insertable/removable frame 20 to the removed position. A further rearward movement of the linear moving ring 14 causes the removed-lens holding surface 58b of the insertion/removal control-projection 58 to come in contact with the pressing-force receiving part 24d of the removal drive lever 24 (see FIG. 9), so that the insertable/removable frame 20 together with the removal drive lever 24 is held in the removed position by the insertion/removal control-projection 58 and is prevented from rotating toward the insertion position. In this lens barrel accommodated state, the resistance to movement (rotation) of the insertable/removable frame 20 toward the removed position that is caused by the insertable/removable frame biasing spring 46 is greater than the resistance to movement of the anti-shake frame 18 that is caused by the extension springs 30 with the three guide balls 28 respectively pressed against the three ball contact surfaces 18a, and accordingly, the anti-shake movable frame 18 is held (locked) without rattling by a pressing force from the insertable/removable frame 20 (the removal drive lever 24) at a specific position in a plane orthogonal to the photographing optical axis O (i.e., the removal assisting position, in which the end of the inner wall of each of the two movement limit holes 18c of the anti-shake frame 18 on the insertion position side of the insertable/removable frame 20 in the Y-axis direction comes into contact with the associated movement limit projection 16d). Although not shown in the drawings, upon the lens barrel reaching the lens barrel accommodated state, a member positioned behind the insertable/removable image-stabilizing lens 12 (e.g., an optical element other than the insertable/removable image-stabilizing lens 12 which is positioned behind the insertable/removable image-stabilizing lens 12 in a ready-to-photograph state) enters an open space created by a removal of the insertable/removable image-stabilizing lens 12 (the cylindrical lens holder portion 20a). This structure makes it possible to reduce the length of the lens barrel in the optical axis direction in the lens barrel accommodated state of the lens barrel to a smaller degree than a type of lens barrel in which a plurality of optical elements are retracted and accommodated in line along the optical axis thereof.

As described above, the present embodiment of the position controller for the insertable/removable image-stabilizing optical element is configured such that, upon the main switch (inputter) 61 inputting the lens-accommodating command signal to the control circuit (controller) 60, the control circuit (controller) 60 shuts off the passage of current through the coils (anti-shake coils) 31 and 32 to switch the anti-shake drive actuator 26 from a driving state to a non-driving state before moving the insertable/removable frame 20 (the insertable/removable image-stabilizing lens 12) from the insertion position to the removed position via the removal drive lever (removal drive mechanism) 24 by moving each of the linear moving ring (advancing/retracting frame) 14 and the shutter unit (advancing/retracting frame) 16 toward an accommodated position from a ready-to-photograph position via the zoom motor (main actuator) 62. This configuration makes it possible to prevent the anti-shake drive actuator 26 from being damaged due to an excessive amount of current being passed through the coils (anti-shake coils) 31 and 32 and wastage of electric power during the retractive movement of the anti-shake frame (anti-shake movable frame) 18 that includes the movement of the insertable/removable image-stabilizing lens (insertable/removable image-stabilizing optical element) 12 to the removed position.

In the aforementioned Japanese Unexamined Patent Publication No. 2007-206210, the following problem arises: a stopper member for fixing the anti-shake movable frame in a centered state thereof and a cam bar for removing the image-stabilizing lens to a position off the optical axis are required as additional members, and the mechanism and control for the movement to accommodate the anti-shake movable frame and the movement to remove the image-stabilizing lens are complicated. Whereas, according to the present embodiment of the position controller for the insertable/removable image-stabilizing lens (insertable/removable image-stabilizing optical element) 12, such a problem does not arise because the anti-shake movable frame 18 is held at a specific position in a plane orthogonal to the photographing optical axis O (i.e., the removal assisting position, in which the end of the inner wall of each of the two movement limit holes 18c of the anti-shake frame 18 on the insertion position side of the insertable/removable frame 20 in the Y-axis direction comes into contact with the associated movement limit projection 16d) using the removal drive lever 24, which is for moving the insertable/removable image-stabilizing lens 12 from the inserted position to the removed position.

Figure 17:
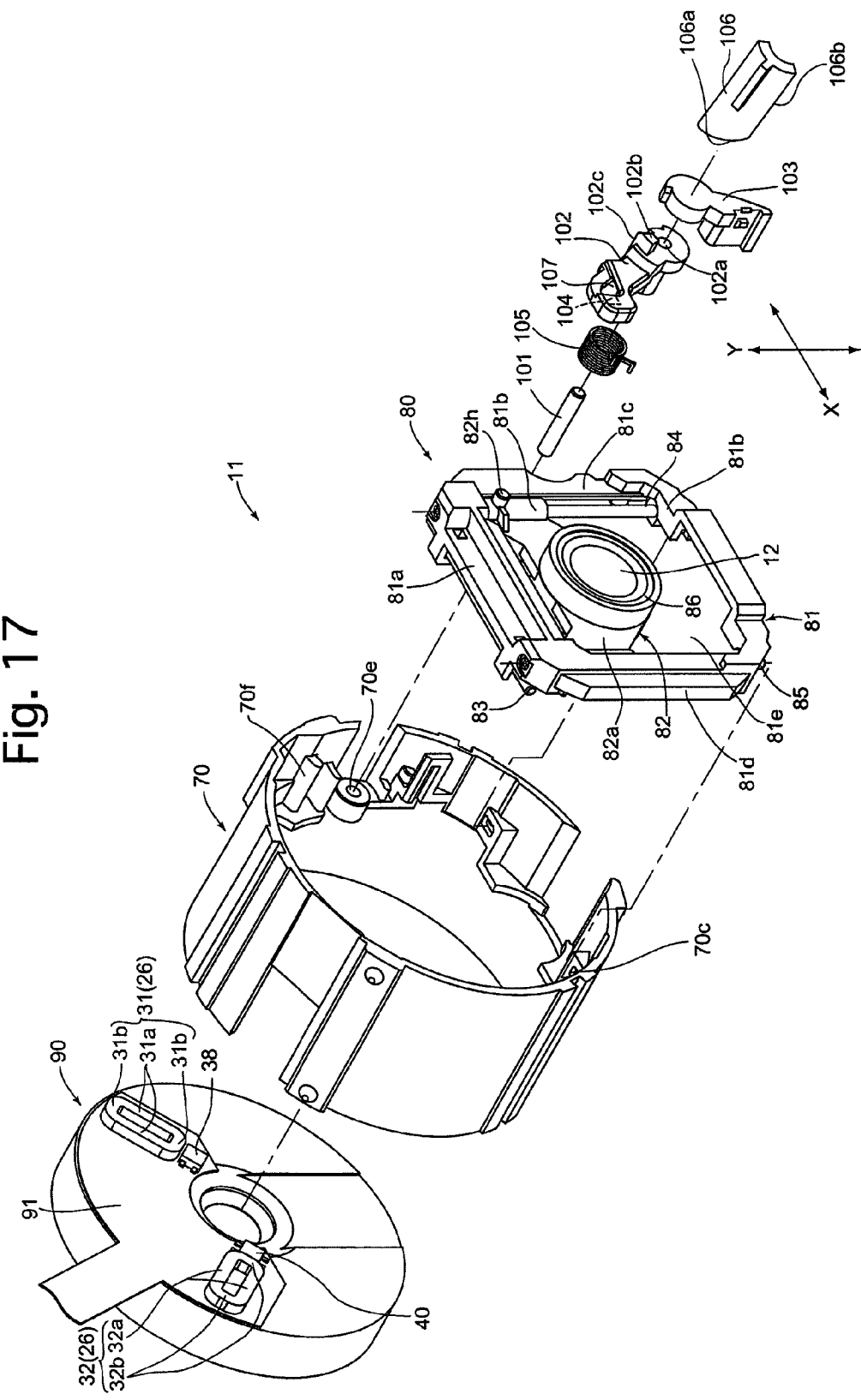
FIG. 17 is an exploded rear perspective view of elements of another embodiment of the anti-shake lens unit according to the present invention.
Figure 18:
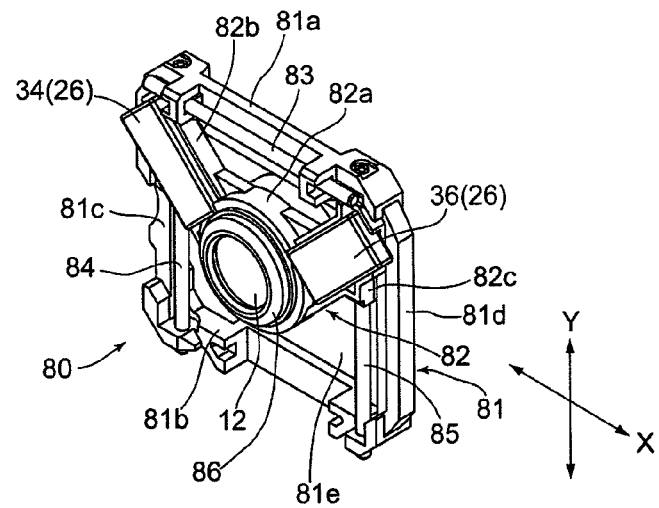
FIG. 18 is a front perspective view of an anti-shake unit shown in FIG. 17 which supports the insertable/removable image-stabilizing optical lens.
Figure 19:
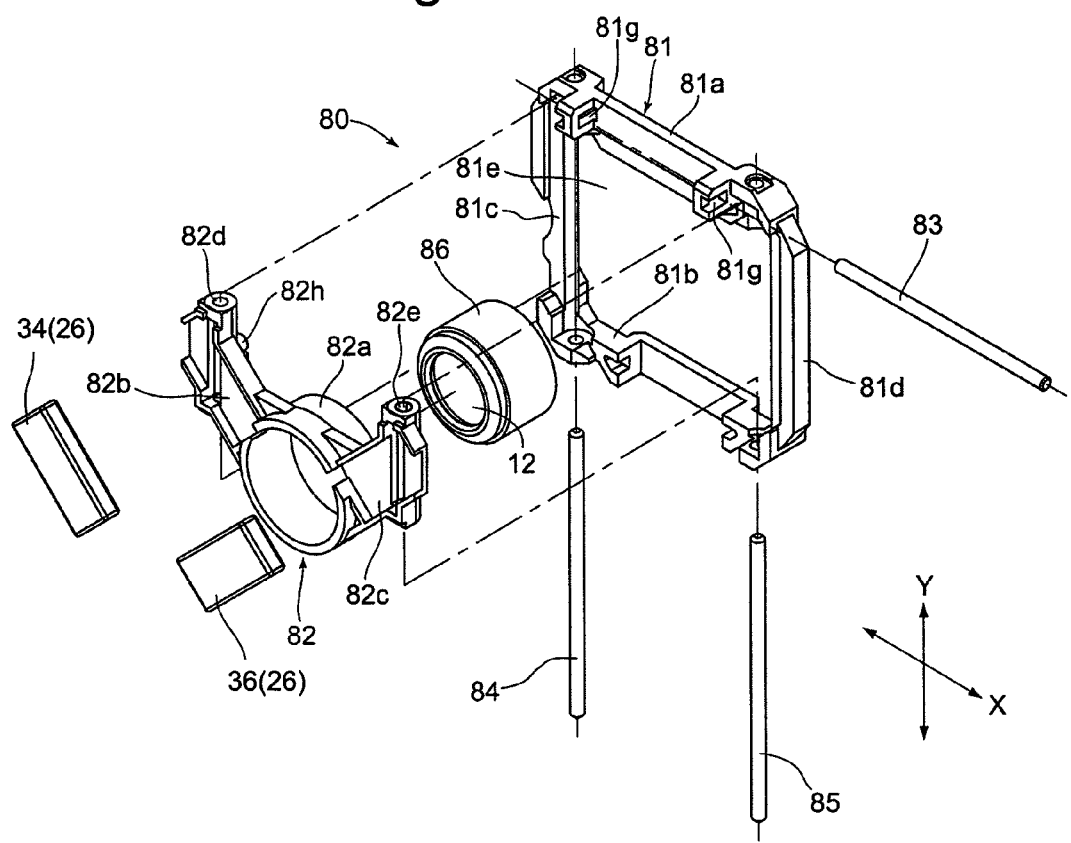
FIG. 19 is an exploded front perspective view of the anti-shake unit, which supports the insertable/removable image-stabilizing optical lens.

Although the present invention has been discussed with reference to the above described embodiment, the anti-shake lens unit (the anti-shake drive mechanism and the removal drive mechanism) to which the present invention is applicable is not limited to the above described particular embodiment of the anti-shake lens unit. FIGS. 17 through 19 show an anti-shake lens unit 11 in another embodiment of the lens barrel according to the present invention to which the present invention is applicable.

The anti-shake lens unit 11 shown in FIGS. 17 through 19 is provided with a linear moving ring (advancing/retracting frame) 70 which is moved in the optical axis direction by the rotational driving of the zoom motor 62 (see FIG. 15). An insertable/removable image-stabilizing lens (insertable/removable image-stabilizing optical element) 12 is supported by the linear moving ring 70 therein via an anti-shake unit (anti-shake movable frame) 80. The anti-shake unit 80 supports the insertable/removable image-stabilizing lens 12 in a manner to allow the insertable/removable image-stabilizing lens 12 to move along a plane substantially orthogonal to the photographing optical axis O. A shutter unit (advancing/retracting frame) 90 which incorporates a shutter is positioned inside the linear moving ring 70 and is fixed to the front of the anti-shake unit 80.

As shown in FIGS. 18 and 19, the anti-shake unit 80 is provided with a first movable stage 81 and a second movable stage 82. The first movable stage 81 is supported by an X-guide shaft 83 to be slidable thereon. The X-guide shaft 83 is fixed inside the linear moving ring 70. The second movable stage 82 is supported by a pair of Y-guide shafts 84 and 85 to be slidable thereon. The pair of Y-guide shafts 84 and 85 are fixed to the first movable stage 81. The axis of the X-guide shaft 83 extends in the lateral direction in a plane orthogonal to the photographing optical axis O, and the moving direction of the first movable stage 81, in which the X-guide shaft 83 is elongated, will be hereinafter referred to as the X-axis direction. The axes of the pair of Y-guide shafts 84 and 85 extend in a plane orthogonal to the photographing optical axis O and in the vertical direction that is orthogonal to the X-guide shaft 83, and the moving direction of the second movable stage 82, in which the pair of Y-guide shafts 84 and 85 are elongated, will be hereinafter referred to as the Y-axis direction.

The first movable stage 81 is provided with an upper side portion 81a and a lower side portion 81b which are spaced from each other in the Y-axis direction and elongated in the X-axis direction, and is further provided with two lateral side portions 81c and 81d which are spaced from each other in the X-axis direction and elongated in the Y-axis direction. The first movable stage 81 is in the shape of a substantially rectangular frame having an opening 81e at a center thereof that is surrounded by the upper side portion 81a, the lower side portion 81b and the two lateral side portions 81c and 81d. The upper side portion 81a is provided thereon, at two different positions in the X-axis direction, with two X-guide holes 81g, respectively. The X-guide shaft 83 is slidably inserted through the two X-guide holes 81g. The Y-guide shaft 84 is fixed to the first movable stage 81 in the opening 81e at a position alongside the lateral side portion 81c and the Y-guide shaft 85 is fixed to the first movable stage 81 in the opening 81e at a position alongside the lateral side portion 81d. The lower ends of the Y-guide shafts 84 and 85 project downward from the lower side portion 81b to be inserted into a pair of elongated holes 70c (see FIG. 17) formed on an inner surface of the linear moving ring 70. The pair of elongated holes 70c are elongated in the X-axis direction to guide the Y-guide shafts 84 and 85 in the X-axis direction. On the other hand, each Y-guide shaft 84 and 85 is prevented from moving in the optical axis direction by the front and rear walls in the associated elongated hole 70c. With the above described structure, the first movable stage 81 is supported by the linear moving ring 70 to be movable in the X-axis direction relative to the linear moving ring 70.

The second movable stage 82 is provided with a cylindrical lens holder portion 82a and a pair of support arms 82b and 82c. An insertable/removable frame 86 which holds the insertable/removable image-stabilizing lens 12 is fixed to the cylindrical lens holder portion 82a. The pair of support arms 82b and 82c extend obliquely upwards into a V-shape so as to be substantially symmetrical with respect to a straight line that extends in the Y-axis direction and passes through the photographing optical axis O. The pair of Y-guide shafts 84 and 85 are slidably inserted into two Y-guide holes 82d and 82e which are formed through the pair of support arms 82b and 82c, respectively. According to this structure, the second movable stage 82 is supported by the first movable stage 81 to be movable in the Y-axis direction relative to the first movable stage 81. Due to this movement of the second movable stage 82 in the Y-axis direction, the second movable stage 82 varies the position thereof in the opening 81e of the first movable stage 81.

The first movable stage 81 and the second movable stage 82 are driven and controlled by the anti-shake drive actuator 26. As described above, the anti-shake drive actuator 26 is provided with the two permanent magnets (anti-shake magnets) 34 and 36 (see FIGS. 18 and 19) that are fixedly mounted on the pair of support arms 82b and 82c, respectively, and the two coils 31 and 32 (see FIG. 17) that are fixed to the shutter unit 90.

The position detection sensor 38 is installed on a rear surface of the shutter unit 90 to correspond to the coil 31 and a position detection sensor 40 is installed on a rear surface of the shutter unit 90 to correspond to the coil 32. The positions of the insertable/removable image-stabilizing lens 12, which moves with the permanent magnets 34 and 36, in the X-axis direction and the Y-axis direction can be detected by the position detection sensors 38 and 40.

The coils 31 and 32 and the position detection sensors 38 and 40 are provided as a module mounted on a shutter flexible PWB 91 fixed to the back of the shutter unit 90. The shutter flexible PWB 91 is connected to the control circuit 60 (see FIG. 15). The passage of current through each coil 31 and 32 is controlled by the control circuit 60. In addition, the positional information obtained by the position detection sensors 38 and 40 is input to the control circuit 60.

When the lens barrel is in a ready-to-photograph state, the upper ends of the support arms 82b and 82c of the second movable stage 82 are positioned in the close vicinity of the upper side portion 81a of the first movable stage 81, and the insertable/removable image-stabilizing lens 12 is in an anti-shake driving position in which the optical axis of the insertable/removable image-stabilizing lens 12 coincides with the photographing optical axis O of the photographing optical system. On the other hand, when the lens barrel is in the lens barrel accommodated state, the lower ends of the support arm portions 82b and 82c of the second movable stage 82 are in contact with the lower side portion 81b of the first movable stage 81 at which the second movable stage 82 is prevented from moving downward, and the insertable/removable image-stabilizing lens 12 is in a removed position (displaced position) in which the optical axis of the insertable/removable image-stabilizing lens 12 is off (removed from) the photographing optical axis O of the photographing optical system.

The controllable range in which the position of the insertable/removable image-stabilizing lens 12 can be controlled by the anti-shake drive actuator 26 is limited to the anti-shake driving position (anti-shake driving range), and the driving of the insertable/removable image-stabilizing lens 12 (the second movable stage 82) in the Y-axis direction when the insertable/removable image-stabilizing lens 12 is positioned in between the anti-shake driving position and the removed position (which deviates from the anti-shake driving position) is performed by a removal drive lever (removal drive mechanism) 102 and a insertion/removal control-projection (removal drive mechanism) 106 which are provided separately from the anti-shake drive actuator 26. The removal drive lever 102 is positioned inside the linear moving ring 70 and pivoted about a support shaft 101 that is fixed to the linear moving ring 70. As shown in FIG. 17, the support shaft 101 is inserted into a shaft hole 102a formed in the removal drive lever 102, the front end of the support shaft 101 is inserted into a shaft support hole 70e formed in the linear moving ring 70 to be supported thereby, and the rear end of the support shaft 101 is supported by a lever retaining member 103 which is fixed to the linear moving ring 70. In this supported state of the support shaft 101, the axis of the support shaft 101 is substantially parallel to the photographing optical axis O, and the removal drive lever 102 is swingable about the support shaft 101. The insertion/removal control-projection 106 is fixedly installed behind the anti-shake unit 80 to project forward in the optical axis direction.

An insertion/removal-operation guide groove 107 and a displacement prevention groove 104 are formed continuously in the removal drive lever 102 to have an L-shape. The insertion/removal-operation guide groove 107 extends in a radial direction with respect to the axis of the shaft hole 102a. The displacement prevention groove 104 is communicatively connected to the radially outer end of the insertion/removal-operation guide groove 107. The width of the displacement prevention groove 104 is greater than the width of the insertion/removal-operation guide groove 107.

The second movable stage 82 is provided with a position control pin 82h which projects rearward from the support arm 82b. The position control pin 82h is positioned in the insertion/removal-operation guide groove 107 or the displacement prevention groove 104 in accordance with the swing position of the removal drive lever 102.

When the second movable stage 82 is in the removed position, the removal drive lever 102 is held at a specific angular position (hereinafter referred to as "removed-lens holding position") at which the direction of elongation thereof from the axis of the shaft hole 102a extends obliquely downwards while the position control pin 82h is engaged (positioned) in the insertion/removal-operation guide groove 107. In this state, the position control of the second movable stage 82 in the Y-axis direction is carried out by sliding engagement of the position control pin 82h with the insertion/removal-operation guide groove 107. From this state a clockwise rotation of the removal drive lever 102 as viewed from the rear in the optical axis direction causes the insertion/removal-operation guide groove 107 to press the position control pin 82h upward, thus moving the second movable stage 82 toward the anti-shake driving position from the removed position.

When the second movable stage 82 is in the anti-shake driving position, the removal drive lever 102 is held at a specific angular position (hereinafter referred to as "lens-insertion position") at which the direction of elongation thereof from the axis of the shaft hole 102a extends obliquely upwards while the position control pin 82h is engaged (positioned) in the displacement prevention groove 104. In this state, the direction of extension (lengthwise direction) of the displacement prevention groove 104 is substantially parallel to the X-axis direction and no position control for the position control pin 82h in the X-axis direction is carried out, and accordingly, the removal drive lever 102 does not interfere with movements of the first movable stage 81 and the second movable stage 82 in the X-axis direction that are caused by the anti-shake drive actuator 26. In addition, the displacement prevention groove 104 is formed greater in width than the insertion/removal-operation guide groove 107 so that a sufficient clearance is provided between the position control pin 82h and the displacement prevention groove 104 so as not to interfere with the movement of the second movable stage 82 in the Y-axis direction that is caused by the anti-shake drive actuator 26.

Rotating the removal drive lever 102 from the lens-insertion position toward the removed-lens holding position with the second movable stage 82 (the insertable/removable image-stabilizing lens 12) in the anti-shake driving position causes the displacement prevention groove 104 to press the position control pin 82h downward to move the second movable stage 82 from the anti-shake driving position to the removed position.

The removal drive lever 102 is biased to rotate toward the lens-insertion position by a lever biasing spring (torsion coil spring) 105, and the linear moving ring 70 is provided on an inner peripheral surface thereof with a stopper 70f with which the removal drive lever 102 comes in contact by the biasing force of the lever biasing spring 105. Accordingly, in a state where no extra external force is exerted on the removal drive lever 102, the removal drive lever 102 is held at the lens-insertion position, so that the second movable stage 82 is held in the anti-shake driving position. Rearward movement of the linear moving ring 70 in the optical axis direction causes the insertion/removal control-projection 106 to press the removal drive lever 102 to thereby rotate the removal drive lever 102 toward the removed-lens holding position from the lens-insertion position against the biasing force of the lever biasing spring 105. More specifically, the insertion/removal control-projection 106 is provided at the front end thereof with an end-face cam 106a, and retracting movement of the linear moving ring 70 toward the insertion/removal control-projection 106 causes a cam-contacting portion 102b that is formed on the removal drive lever 102 to come into contact with the end-face cam 106a. Thereafter, a further retracting movement of the linear moving ring 70 with the cam-contacting portion 102b in contact with the end-face cam 106a causes a component force which causes the removal drive lever 102 to rotate toward the removed-lens holding position to be created from the rearward moving force of the linear moving ring 70 in the optical axis direction. Upon the removal drive lever 102 reaching the removed-lens holding position, a removed-lens holding surface 106b which is formed on the insertion/removal control-projection 106 on a side thereof extending substantially parallel to the photographing optical axis O is engaged with a removed-lens holding surface 102c formed on the removal drive lever 102 so that the removal drive lever 102 is held in the removed-lens holding position.

In the anti-shake lens unit 11 also, having the above-described configuration, upon the main switch (inputter) 61 inputting the lens-accommodating drive signal to the control circuit (controller) 60, the control circuit (controller) 60 shuts off the passage of current through the coils (anti-shake coils) 31 and 32 to switch the anti-shake drive actuator 26 from a driving state to a non-driving state before moving the insertable/removable frame 86 (the insertable/removable image-stabilizing lens 12) from the insertion position to the removed position via the removal drive lever 102 by moving each of the linear moving ring (advancing/retracting frame) 70 and the shutter unit (advancing/retracting frame) 90 toward an accommodated position from a ready-to-photograph position using the zoom motor (main actuator) 62. Therefore, the anti-shake drive actuator 26 can be prevented from being damaged due to an excessive amount of current being passed through the coils (anti-shake coils) 31 and 32 and prevented from wasting electric power during the retractive movement of the anti-shake movable frame 80 that includes the movement of the insertable/removable frame 20 (the insertable/removable image-stabilizing lens 12) to the removed position.

In the above described embodiments, upon the main switch (inputter) 61 inputting the accommodating command signal to the control circuit (controller) 60, the control circuit (controller) 60 shuts off the passage of current through the coils (anti-shake coils) 31 and 32 to switch the anti-shake drive actuator 26 from a driving state to a non-driving state and thereafter moves the advancing/retracting frames (14 and 16, or 70 and 90) toward the accommodated position from a ready-to-photograph position using the zoom motor (main actuator) 62. However, upon the main switch (inputter) 61 inputting the accommodating command signal to the control circuit (controller) 60, the control circuit (controller) 60 can shut off the passage of current through the coils (anti-shake coils) 31 and 32 to switch the anti-shake drive actuator 26 from a driving state to a non-driving state after commencing to move the advancing/retracting frames (14 and 16, or 70 and 90) toward the accommodated position from a ready-to-photograph position using the zoom motor (main actuator) 62 and before commencing to move the insertable/removable frame (20 or 86) (the insertable/removable image-stabilizing lens 12) from the insertion position to the removed position via the removal drive mechanism (24 or 102).

In the above illustrated embodiments, when the advancing/retracting frame (the linear moving ring 14 and the shutter unit 16; or the linear moving ring 70 and the shutter unit 90) is moved from the ready-to-photograph position to the accommodated position by the main actuator (zoom motor 62), the insertion/removal control-projection 58 (or the insertion/removal control-projection 106) comes in contact with and presses the removal drive lever 24 (or 102), and the removal drive lever 24 (or 102) presses (engages with) the insertable/removable frame 20 (or 86) so as to move the insertable/removable frame 20 (or 86) from the insertion position to the removed position.

However, the present invention can be applied to a position controller which uses a removal drive mechanism like that disclosed in, e.g., the above-mentioned Japanese Patent Publication No. 2007-206210, in which a control projection (corresponding to the insertion/removal control-projection 58 or the insertion/removal control-projection 106 of the present invention) directly presses (engages with) an insertable/removable frame (corresponding to the insertable/removable frame 20 or 86 of the present invention) so as to move the insertable/removable frame from the insertion position to the removed position.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A position controller for an image-stabilizing optical element which is provided in a photographing optical system, said position controller comprising:

an advancing/retracting frame which moves in an optical axis direction of said photographing optical system between a ready-to-photograph position and an accommodated position;

a main actuator which drives said advancing/retracting frame between said ready-to-photograph position and said accommodated position;

an anti-shake movable frame supported by said advancing/retracting frame to be movable in directions orthogonal to said optical axis;

an anti-shake drive actuator which includes at least one coil and at least one magnet installed to one and the other of said advancing/retracting frame and said anti-shake movable frame and drives and controls said anti-shake movable frame with respect to said advancing/retracting frame in a plane orthogonal to said optical axis by controlling passage of current through said coil;

an insertable/removable frame which holds said image-stabilizing optical element and is supported by said anti-shake movable frame to be movable between an insertion position in which said image-stabilizing optical element is positioned on said optical axis when said advancing/retracting frame is in said ready-to-photograph position and a removed position in which an optical axis of said image-stabilizing optical element is removed from said optical axis of said photographing optical system when said advancing/retracting frame is in said accommodated position;

a removal drive mechanism which engages with said insertable/removable frame and moves said insertable/removable frame from said insertion position to said removed position when said advancing/retracting frame is moved from said ready-to-photograph position to said accommodated position by said main actuator;

a controller which controls operations of said main actuator and said anti-shake drive actuator; and an inputter which inputs an accommodating command signal for moving said advancing/retracting frame from said ready-to-photograph position to said accommodated position by said main actuator to said controller, wherein said removal drive mechanism makes said anti-shake movable frame follow movement of said insertable/removable frame in a direction toward said removed position of said insertable/removable frame when moving said insertable/removable frame from said insertion position to the removed position via said removal drive mechanism, and wherein, upon said inputter inputting said lens-accommodating drive signal to said controller, and before said following movement of said anti-shake movable frame in a direction toward said removed position of said insertable/removable frame, said controller shuts off said passage of current through said coil to switch said anti-shake drive actuator from a driving state thereof to a non-driving state thereof before moving said insertable/removable frame from said insertion position to the removed position via said removal drive mechanism by moving said advancing/retracting frame toward said accommodated position from said ready-to-photograph position using said main actuator.

2. The position controller according to claim 1, wherein, upon said inputter inputting said accommodating command signal to said controller, said controller shuts off said passage of current through said coil to switch said anti-shake drive actuator from a driving state to a non-driving state and thereafter moves said advancing/retracting frame toward said accommodated position from said ready-to-photograph position using said main actuator.

3. The position controller according to claim 1, wherein, upon said inputter inputting said accommodating command signal to said controller, said controller sends an excitation cancel command signal for shutting off said passage of current through said coil to said anti-shake drive actuator and thereafter sends an accommodating drive command signal for accommodating said advancing/retracting frame to said main actuator.

4. The position controller according to claim 1, wherein said removal drive mechanism holds said anti-shake movable frame at a specific position in a plane orthogonal to said optical axis when said insertable/removable frame is held at said removed position by said removal drive mechanism.

5. The position controller according to claim 1, further comprising:

at least one guide member installed between said advancing/retracting frame and said anti-shake movable frame to allow said anti-shake movable frame to move in a plane orthogonal to said optical axis with said guide member held between said advancing/retracting frame and said anti-shake movable frame;

a first biaser which biases said advancing/retracting frame and said anti-shake movable frame in directions toward each other in said optical axis direction to keep said guide member held between said advancing/retracting frame and said anti-shake movable frame;

a second biaser which biases said insertable/removable frame to move toward said insertion position; and a movement limiter which limits a moving range of said anti-shake movable frame at least toward said removed position of said insertable/removable frame, wherein a resistance to movement of said insertable/removable frame toward said removed position that is caused by said second biaser is greater than a resistance to movement of said anti-shake movable frame that is caused by said first spring, and wherein said removal drive mechanism moves said anti-shake movable frame together with said insertable/removable frame toward said removed position thereof until movement of said anti-shake movable frame is limited by said movement limiter, and thereafter moves said insertable/removable frame solely to said removed position with said anti-shake movable frame held by said movement limiter at a specific position in a plane orthogonal to said optical axis.

6. The position controller according to claim 5, wherein said at least one guide member comprises at least three balls.

7. The position controller according to claim 1, wherein said main actuator comprises a motor.

8. The position controller according to claim 1, wherein said removal drive mechanism comprises a lever pivoted about a shaft parallel to said optical axis and a control projection which is fixed to the position controller as a stationary member, wherein said control projection comes in contact with and presses said lever so that said lever engages with said insertable/removable frame and moves said insertable/removable frame from said insertion position to said removed position when said advancing/retracting frame is moved from said ready-to-photograph position to said accommodated position.

* * * * *